US009178709B2

(12) United States Patent
Higashida et al.

(10) Patent No.: US 9,178,709 B2
(45) Date of Patent: Nov. 3, 2015

(54) COMMUNICATION SYSTEM AND METHOD FOR DISTRIBUTING CONTENT

(75) Inventors: Masaaki Higashida, Osaka (JP); Shotaro Tanaka, Nara (JP); Yasuaki Sakanishi, Osaka (JP); Seiji Horita, Osaka (JP); Tadayuki Inoue, Hyogo (JP); Kenshi Taniguchi, Osaka (JP); Toshihiro Ezaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 694 days.

(21) Appl. No.: 10/588,537

(22) PCT Filed: Mar. 29, 2005

(86) PCT No.: PCT/JP2005/005954
§ 371 (c)(1),
(2), (4) Date: Aug. 7, 2006

(87) PCT Pub. No.: WO2005/096569
PCT Pub. Date: Oct. 13, 2005

(65) Prior Publication Data
US 2009/0141718 A1    Jun. 4, 2009

(30) Foreign Application Priority Data

Mar. 30, 2004    (JP) ................................. 2004-098932

(51) Int. Cl.
*H04L 12/18* (2006.01)
*H04L 12/54* (2013.01)
(Continued)

(52) U.S. Cl.
CPC ............ *H04L 12/1836* (2013.01); *H04L 12/56* (2013.01); *H04L 69/08* (2013.01);
(Continued)

(58) Field of Classification Search
None
See application file for complete search history.

(56) References Cited

U.S. PATENT DOCUMENTS 5,973,722 A * 10/1999 Wakai et al. .................... 725/76
6,076,114 A *  6/2000 Wesley .......................... 709/235
(Continued)

FOREIGN PATENT DOCUMENTS

EP    1 134 933    1/2004
EP    1 679 855    7/2006
(Continued)

OTHER PUBLICATIONS

"*802.11 High-Speed Wireless Lan Textbook*", (published by IDG Japan Co., Ltd.), Mar. 29, 2003.
(Continued)

*Primary Examiner* — Faruk Hamza
*Assistant Examiner* — Andrew Oh
(74) *Attorney, Agent, or Firm* — Wenderoth, Lind & Ponack, L.L.P.

(57) ABSTRACT

A wireless communication system performs high-quality communication using Multicast communication where retransmission processing is performed. The wireless communication system includes a program distribution unit for distributing a program using the Multicast communication; a first communication path for transmitting the program distributed from the program distribution unit; first communication units; user terminals; and a second and the user terminal and is also a wireless communication path where the retransmission of a frame is performed, wherein the first communication unit selects a Multicast frame of a program requested by the user terminal from the first communication path, converts the selected Multicast frame into a Unicast frame, and transmits the converted Unicast frame to the user terminal.

17 Claims, 16 Drawing Sheets

(51) Int. Cl.
*H04L 29/06* (2006.01)
*H04N 21/6408* (2011.01)
*H04N 21/6405* (2011.01)
*H04L 12/46* (2006.01)

(52) U.S. Cl.
CPC .......... *H04L 12/189* (2013.01); *H04L 12/1868* (2013.01); *H04L 12/4633* (2013.01); *H04N 21/6405* (2013.01); *H04N 21/6408* (2013.01)

(56) References Cited

U.S. PATENT DOCUMENTS

| | | | |
|---|---|---|---|
| 6,216,171 B1 * | 4/2001 | Isono et al. | 709/250 |
| 6,389,023 B1 | 5/2002 | Matsuzawa et al. | |
| 6,430,155 B1 * | 8/2002 | Davie et al. | 370/232 |
| 6,751,219 B1 * | 6/2004 | Lipp et al. | 370/390 |
| 6,788,681 B1 * | 9/2004 | Hurren et al. | 370/389 |
| 6,836,481 B1 | 12/2004 | Hotta | |
| 7,269,182 B1 * | 9/2007 | Carrel et al. | 370/432 |
| 7,280,495 B1 * | 10/2007 | Zweig et al. | 370/312 |
| 7,411,901 B1 * | 8/2008 | Alexander et al. | 370/230 |
| 7,590,114 B1 * | 9/2009 | Bishara | 370/390 |
| 7,590,757 B2 * | 9/2009 | Jinzaki | 709/245 |
| 7,627,690 B2 * | 12/2009 | Kobayashi | 709/238 |
| 7,924,837 B1 * | 4/2011 | Shabtay et al. | 370/392 |
| 2001/0018714 A1 * | 8/2001 | Yagyu et al. | 709/245 |
| 2001/0026556 A1 | 10/2001 | Yagyu et al. | |
| 2002/0019875 A1 * | 2/2002 | Garrett et al. | 709/230 |
| 2002/0151278 A1 | 10/2002 | McLain et al. | |
| 2003/0012202 A1 * | 1/2003 | Fukutomi | 370/395.52 |
| 2003/0026240 A1 * | 2/2003 | Eyuboglu et al. | 370/349 |
| 2003/0065799 A1 * | 4/2003 | Kitamura | 709/230 |
| 2003/0174706 A1 * | 9/2003 | Shankar et al. | 370/393 |
| 2003/0177267 A1 * | 9/2003 | Orava et al. | 709/245 |
| 2003/0195984 A1 * | 10/2003 | Zisapel et al. | 709/238 |
| 2004/0037279 A1 * | 2/2004 | Zelig et al. | 370/390 |
| 2004/0057459 A1 * | 3/2004 | Sharony et al. | 370/468 |
| 2004/0073612 A1 * | 4/2004 | Kim et al. | 709/205 |
| 2004/0120329 A1 * | 6/2004 | Chung et al. | 370/407 |
| 2004/0158872 A1 * | 8/2004 | Kobayashi | 725/120 |
| 2004/0190514 A1 * | 9/2004 | Uchiyama et al. | 370/390 |
| 2004/0221042 A1 * | 11/2004 | Meier | 709/227 |
| 2005/0027782 A1 * | 2/2005 | Jalan et al. | 709/200 |
| 2005/0169272 A1 * | 8/2005 | Lo et al. | 370/392 |
| 2006/0062187 A1 * | 3/2006 | Rune | 370/338 |
| 2006/0154603 A1 * | 7/2006 | Sachs et al. | 455/39 |
| 2006/0165107 A1 * | 7/2006 | Legallais et al. | 370/401 |
| 2006/0259620 A1 * | 11/2006 | Tamai | 709/225 |
| 2007/0274321 A1 * | 11/2007 | Jonsson et al. | 370/395.53 |

FOREIGN PATENT DOCUMENTS

| | | | |
|---|---|---|---|
| EP | 1679855 A1 * | 7/2006 | ............. H04L 12/18 |
| JP | 11-196041 | 7/1999 | |
| JP | 2001-177523 | 6/2001 | |
| JP | 2001-230774 | 8/2001 | |
| JP | 2001-244976 | 9/2001 | |
| JP | 2001-244978 | 9/2001 | |
| JP | 2001-326685 | 11/2001 | |
| JP | 2002-290400 | 10/2002 | |
| JP | 2002-330469 | 11/2002 | |
| JP | 2003-198489 | 7/2003 | |
| WO | 02/080456 | 10/2002 | |
| WO | 03/019861 | 3/2003 | |
| WO | 2005/036818 | 4/2005 | |

OTHER PUBLICATIONS

English translation of paragraph [0021] of JP 2002-330469.
Supplementary European Search Report issued Jun. 4, 2010 in the corresponding European Application No. 05 72 7634.
Chennikara et al. "Application-Layer Multicast for Mobile Users in Diverse Networks" Globecom '02—IEEE Global Telecommunications conference. Conference Proceedings. Taipei, Taiwan, Nov. 17-21, 2002; [IEEE Global Telecommunications Conference], New York, NY: IEEE, US LNKD-DOI:10.1109/GLOCOM.2002.1188491, Nov. 17, 2002, pp. 1713-1718.
Abhik Majumdar et al. "Multicast and Unicast Real-Time Video Streaming Over Wireless LANs" IEEE Transactions on Circuits and Systems for Video Technology, IEEE Service Center, Piscataway, NJ, US, vol. 12, No. 6, Jun. 1, 2002.
European Office Action (in English) issued Oct. 17, 2011 in European Application 05727634.7, which is a foreign counterpart of the present application.
Peng Ge et al.: "Comparisons of Error Control Techniques for Wireless Video Multicasting", Conference Proceedings of the 2002 IEEE International Performance, Computing, and Communications Conference, Phoenix, AZ, Apr. 3-5, 2002; IEEE International Performance, Computing, and Communications Conference, New York, NY: IEEE, US, vol. Conf. 21, Apr. 3, 2002, pp. 93-102, XP010588360, DOI: 10.1109/IPCCC.2002.995140, ISBN: 978-0-7803-7371-6.
European Summons to attend oral proceedings pursuant to Rule 115(1) EPC issued in European Application No. 05727634.7.

* cited by examiner

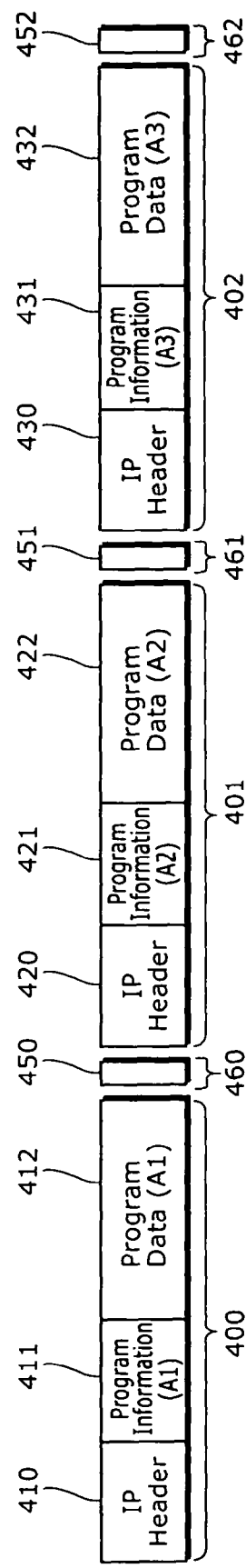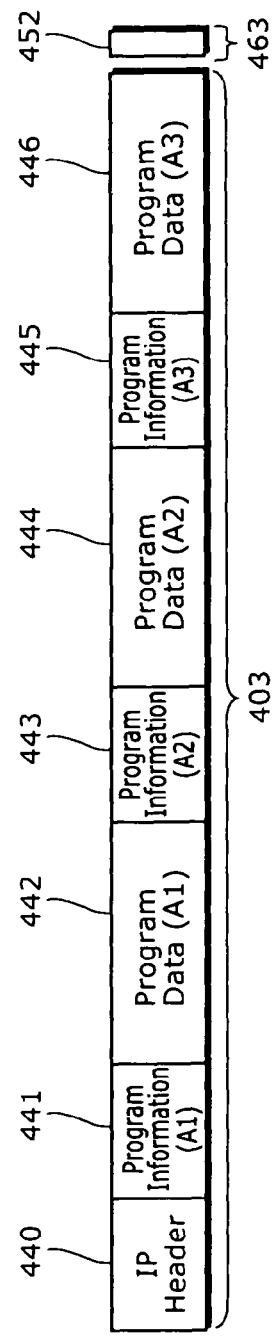
FIG. 10A
FIG. 10B

COMMUNICATION SYSTEM AND METHOD FOR DISTRIBUTING CONTENT

BACKGROUND OF THE INVENTION

1. Technical Field

The present invention relates to a communication device and a communication system for transmitting a content such as a program or data selected by a user to a user terminal via a network (a communication path).

2. Background Art

Conventionally, systems for distributing video programs, audio programs, and the like from a server via a network (a communication path) to a terminal used by a user (hereinafter, referred to as program distribution systems) have been put to practical use. One example of those systems is a program distribution system which is utilized in airplanes (hereinafter, referred to as an airplane program distribution system). By the airplane program distribution system, a passenger (a user) uses a terminal equipped in a user's seat in order to select a desired program from programs distributed from a video server equipped in an airplane, and to watch and listen to the program.

One of the technical methods for distributing a large number of the programs via a network is IP Multicast using the Internet Protocol (IP). The IP Multicast is a system for transmitting identical data to multiple designated recipients in the network. Hereinafter, in this description, distribution of a program to multiple users by using the IP is referred to as IP Multicast, and distribution of a program to multiple users in a general sense is referred to merely as Multicast. On the other hand, not like Multicast, a method for designating a single recipient and transmitting data to the unique recipient is called Unicast.

The IP Multicast is used, for example, in a case where a frame is transmitted from a single transmitting node such as a server to multiple receiving terminals. For instance, the IP Multicast is used in a case where a video program transmitted from a video server is watched and listened to by a plurality of terminals.

A transmitting node transmits a frame to a specific group. A transmitting node for Multicast transmits only one frame, and the frame is duplicated by a router at some midpoint to be distributed to receiving terminals. The router at some midpoint duplicates the frame only in a case where a receiver of Multicast exists in a different interface. Therefore, only one frame having the same contents is transmitted to where the frame is requested. Accordingly, network bands are able to be efficiently used, and the frame is duplicated by the routers which are dispersedly positioned on the network, so that the loads can be dispersed.

IP Multicast is defined in RFC2236 and RFC1112, and IP addresses of class D (224.0.0.0 to 239.255.255.255) are reserved for use as Multicast addresses. If communication is performed to these addresses over Multicast, simultaneous transmission to nodes belonging to a Multicast group (address) is performed.

In order to join an (appropriate) multicast group, a protocol of the Internet Group Management Protocol (IGMP) is applied. The IGMP is used when a receiving terminal host joins or leaves the group or when information regarding the group is exchanged between IP Multicast routers. Using the IP Multicast system, a group is formed for each video program, then communication using IP Multicast is performed, and a user joins a Multicast group regarding a video program which the user wishes to watch or listen to, so that the user can watch and listen to the desired program.

FIG. 1 shows a schematic structure of the conventional program distribution system using IP Multicast. Referring to FIG. 1, a reference numeral 1000 represents a program distributing unit such as a video server. A reference numeral 1001 represents a communication path such as an Ethernet®. A reference numeral 1002 represents a router which supports Multicast. A reference numeral 1003 represents a router which supports Multicast. A reference numeral 1004 represents a user terminal. Reference numerals of the user terminals 1004 are assigned with additional characters a to h, respectively.

The program distribution unit 1000 transmits all distributable programs using IP Multicast (hereinafter, the transmitting program is referred to as a program stream). FIG. 1 shows an example in which there are four different programs (B1, B2, B3, and B4).

For example, the program B1 uses a Multicast IP address 224.0.0.1, the program B2 uses a Multicast IP address 224.0.0.2, the program B3 uses a Multicast IP address 224.0.0.3, and the program B4 uses a Multicast IP address 224.0.0.4. This means that a group of programs is formed for each IP address.

Generally, in IP Multicast, a User Datagram Protocol (UDP) is used at the fourth layer (Transport layer) of the Open Systems Interconnection (OSI) model. More specifically, the Ethernet® is used at the second layer (Data link layer) of the OSI model, and re-transmission is performed using the IP at the third layer (Network layer) of the OSI model in order to be realized as a so-called stream transmission.

All programs are transmitted via the communication path 1001 (X1 and X2), so that by using multicast addresses 224.0.0.1 to 224.0.0.4, the programs B1 to B4 are transmitted (X2 transmits the programs to a next router (not shown)).

The user terminals 1004*a* to 1004*d* which are managed by the router 1003*a* is used to watch and listen to the programs B1, B2, and B3, so that X3 uses Multicast addresses 224.0.0.1 to 224.0.0.3 to transmit the programs B1, B2, and B3. From the router 1003*a*, each program is transmitted to the user terminal 1004. More specifically, X5 uses 224.0.0.1 to transmit the program B1 to the user terminal 1004*a*, X6 uses 224.0.0.2 to transmit the program B2 to the user terminal 1004*b*, X7 uses 224.0.0.3 to transmit the program B3 to the user terminal 1004*c*, and X8 uses 224.0.0.1 to transmit the program B1 to the user terminal 1004*d*. Here, since the identical program B1 is to be watched and listened to by using the user terminal 1004*a* and the user terminal 1004*d*, the router 1003*a* duplicates the program data to be transmitted.

In the same manner, the programs B1, B2, and B4 are watched and listened to by using the user terminals 1004*e* to 1004*h* which are managed by the router 1003*b*, so that X4 uses Multicast addresses 224.0.0.1, 224.0.0.2, and 224.0.0.4 to transmits the programs B1, B2, and B4. From the router 1003*b*, each program is transmitted to the user terminal 1004. More specifically, X9 uses 224.0.0.4 to transmit the program B4 to the user terminal 1004*e*, X10 uses 224.0.0.1 to transmit the program B1 to the user terminal 1004*f*, X11 uses 224.0.0.4 to transmit the program B4 to the user terminal 1004*g*, and X12 uses 224.0.0.2 to transmit the program B2 to the user terminal 1004*h*. Since the identical program B4 is watched and listened to by using the user terminal 1004*e* and the user terminal 1004*g*, the router 1003*b* duplicates the program data to be transmitted.

In FIG. 1 explains the example in which a wired Ethernet® is used as the communication path. In general, airplanes have constraints on a space to be equipped with communication devices or wires. For example, the router 1002 is equipped in a ceiling part of the airplane, X1 and X2 are wired along the ceiling, the user terminal 1004 is equipped in each passenger seat, and the router 1003 is equipped for each set of the seats. In the case of the example of FIG. 1, one router 1003 is equipped in one of four seats in a row, and the router 1003 is wired directly to the respective four user terminals 1004. A wire from the router 1002 to the router 1003 is equipped along a wall of the airplane.

Note that in the description with reference to FIG. 1, the Ethernet® is used as an example of the communication path 1001 and the program transmission unit 1002, but there is another method for performing the program distribution by using a modulation technique of Quadrature Amplitude Modulation (QAM) in a coaxial cable.

In the meantime, a wireless Local Area Network (hereinafter, referred to as a wireless LAN) has recently been widely used, and communication over the wireless LAN in airplanes is desired. By using the wireless LAN, wiring in the above space of the airplane becomes no more necessary, so that wiring construction is significantly reduced. Furthermore, in addition to the program distribution, it is also possible to realize connection between the Internet and a computer which the user brings into the airplane. One example of the wireless LAN is a communication method based on IEEE802.11. Regarding the details of the IEEE802.11, numerous technical books have been published, for example, "802.11 high-speed wireless LAN textbook" (published by IDG Japan Co., Ltd.).

The IEEE802.11 defines IEEE802.11a (maximum communication speed is 54 Mb/s), IEEE802.11b (maximum communication speed is 11 Mb/s), IEEE802.11g (maximum communication speed is 54 Mb/s), and the like. Effective IP throughputs of the above are approximately 20 Mb/s, approximately 4 Mb/s, and approximately 20 Mb/s, respectively. Furthermore, a technique such as IEEE802.11n is targeted at more speedy communication.

An important aspect of the present invention is that, in the wireless communication such as communication based on IEEE802.11, a MAC layer which is the Data link layer (the second layer of the OSI model) has a re-transmission system. In the IEEE802.11, a transmitting terminal transmits a frame, then if a receiving terminal receives the frame successfully, the receiving terminal sends back a frame indicating the receiving success (ACK frame), and therefore the transmitting terminal transmits the frame again if the ACK frame is not received within a predetermined time period. In general, this re-transmitting processing is repeated for a plurality of times until the frame is transmitted successfully. However, the re-transmitting at the MAC layer is performed only in communication using Unicast, and in communication using group addresses such as communication over Broadcast and Multicast, receiving stations do not send the ACK frame back. This is described in more detail with reference to a figure. FIG. 3 is a schematic block diagram of a MAC frame.

In FIG. 3, a reference numeral 1900 represents a MAC header, a reference numeral 1901 represents a frame body, and a reference numeral 1902 represents a frame check sequence (FSC). The MAC header 1900 includes four address fields. A reference numeral 1903 represents an address 1, 1904 represents an address 2, 1905 represents an address 3, and 1906 represents an address 4.

For example, in a case where transmission is performed between an access point (AP) and a station (STA), the address 1 stores a destination address, the address 2 stores a basic service set identifier (BSSID), and the address 4 stores a source address. Note that the address 4 is not used at this moment. Here, if the address 1 is a Unicast address, the re-transmission processing is performed, and if the address is a Broadcast or Multicast address, the re-transmission processing is not performed.

Note that the frame body stores an IP frame including an IP header as shown in FIG. 10A as described further below. This means that a wireless frame includes a MAC header and an IP header.

FIG. 2 is a schematic block diagram of IP Multicast using wireless communication in the middle of a transmission path. Processing until a router 1102 receives programs is same as the processing described with reference to FIG. 1. A reference numeral X700 represents a wireless LAN based on IEEE802.11 and transmits IP Multicast frames. As far as receiving terminals exist within an area where radio waves can be detected, all receiving terminals can receive the frames. In FIG. 2, a router 1102 is shown as a router which has a wireless access point (AP) function, and routers 1103a and 1103b are shown as routers which have a receivable station (STA) function. If the IP Multicast system is directly applied, the AP 1102 is requested from a plurality of STAs 1103 to transmit an identical program, so that the AP 1102 duplicates the program and should use Multicast addresses as the MAC addresses by which the plurality of STAs can receive the program.

Processing from the router 1103 to the user terminals 1004 is the same as the processing described with reference to FIG. 1. As described above, IP Multicast can be applied to the wireless LAN but this causes a problem as described further below.

Besides the system in FIG. 1, another example of the conventional system for performing communication over Multicast by using wireless LAN is disclosed in Japanese Patent Laid-Open No. 11-196041 publication (hereinafter, referred to as a patent document 1).

The patent document 1 is aimed to improve efficiency of the communication over Multicast, by grouping receiving stations among which data can be exchanged directly, from receiving stations which exist in a communication area where a single transmitting station (access point AP) can cover, then selecting as a representative station an arbitrary receiving station from the group, and utilizing the condition that a ACK or a NAK which is sent from the representative station back to the transmitting station can be received among the group.

Furthermore, examples for the conventional method for changing a part of the IP Multicast communication to Unicast communication and then, after that part, the Unicast communication is changed back to the IP Multicast communication are disclosed in Japanese Patent Laid-Open No. 2001-244976 (hereinafter, referred to as a patent document 2), Japanese Patent Laid-Open No. 2001-244978 publication (hereinafter, referred to as a patent document 3), and Japanese Patent Laid-Open No. 2001-230774 publication (hereinafter, referred to as a patent document 4). In these examples, the UDP is used at the Transport layer, negotiation is performed between communication devices in an area where Unicast communication is performed, IP Multicast which is a system at the Network layer is associated with the UDP at the Transport layer, and the communication device has "management tables" (peer management tables in the patent document 2 and the patent document 3) and "management tables (management tables in the patent document 4), so that the Unicast communication is changed back to the IP Multicast communication.

The patent documents 2, 3, and 4 are systems for passing each Multicast frame through a communication path, such as the Internet, on which routers and the like do to support Multicast communication, so that these patent documents do not disclose a technology regarding a part in which the Multicast frame needs to be cuplicated.

[Patent Document 1] Japanese Patent Laid-Open No. 11-196041 publication
[Patent Document 2] Japanese Patent Laid-Open No. 2001-244976 publication
[Patent Document 3] Japanese Patent Laid-Open No. 2001-244978 publication
[Patent Document 4] Japanese Patent Laid-Open No. 2001-230774 publication
[Non-Patent Document 1] "802.11 High-Speed Wireless LAN Textbook" (published by IDG Japan Co., Ltd.)

DISCLOSURE OF INVENTION

However, the wireless IP Multicast as shown in FIG. 2 has the following problems. In a case where communication over IP Multicast is directly applied to wireless communication, even processing at the MAC layer works if an IP Multicast address is used as a MAC address. More specifically, if a Multicast address is used as the IP address and also as the MAC address, each access point determines that a transmitted frame is addressed to the access point and then receives the frame. Generally, based on an address translation standard by which a part of the IP Multicast address is copied onto the MAC address, and data indicating that the address is subject to Multicast is stored into a head of the MAC address to be transmitted, communication is changed to IP Multicast communication so that the IP Multicast communication can perform communication over Multicast even at the MAC layer. However, if the Multicast address is used as the MAC address, the re-transmission processing is not performed. In general, the wireless communication suffers from more frequent errors on frames, so that high-quality transmission cannot be expected without the re-transmission processing. That is why wireless communication has the function of the re-transmission. In other words, in the wireless transmission, it is possible to utilize the Multicast communication by which a frame is simultaneously transmitted to respective receiving terminals, but there is a problem that quality of the communication becomes significantly lowered.

Furthermore, the above patent document 1 has the following problems. In addition that processing is necessary for grouping the receiving stations among which data can be exchanged directly, there is a case where the ACK or NAK is not received successfully even within the set group since a range within which the receiving stations can directly receive data is changed in the wireless communication due to status of the radio waves, an installation environment, and the like, so that the system of the patent document 1 does not work correctly.

Furthermore, an algorithm for receiving the ACK or NAK from the terminal within the group in order to operate each terminal, an algorithm by which the receiving stations performs polling on the representative station, and the like are not methods based on IEEE802.11 standard, so that general-purpose devices are not able to be used thereby resulting in cost increase.

Moreover, the patent documents 2, 3, and 4 have a problem that further communication processing is necessary to create tables to have the "management tables (peer management tables in the patent documents 2 and 3)" and the "management table (management table in the patent document 4)" in the communication device in order to change the Unicast communication back to the IP Multicast communication, so that the management of each table become complicated.

Furthermore, the patent documents 2, 3, and 4 are assumed to use a protocol basically without the re-transmission function such as an Ethernet® at the Data link layer, but if the wireless communication does not have the re-transmission function as described above, there is another problem that the quality of the communication becomes significantly lowered.

Still further, the patent documents 2, 3, and 4 are systems using processing at the Transport layer (UDP), so that there is still another problem that the transmission protocol used at the Transport layer is restricted.

Still further, there is still another problem that the general IP Multicast communication needs expensive routers all of which support protocols required to perform the IP Multicast communication.

Therefore, the present invention addresses to the above problems, and an object of the present invention is to provide a communication system to realize high-quality Multicast communication using wireless communication having re-transmission processing.

SUMMARY OF THE INVENTION

To achieve the above object, the communication system according to the present invention includes (a) a first communication device and a second communication device, wherein (b) the first communication device includes: (b1) a first content receiving unit operable to receive, via a first communication path, a Multicast frame which stores a content; (b2) a conversion unit operable to convert the received Multicast frame into a Unicast frame addressed to the second communication device; and (b3) a first content transmission unit operable to transmit the converted Unicast frame to the second communication device via a wireless second communication path, based on a protocol having a re-transmission processing, and the second communication device includes (c) a second content receiving unit operable (c1) to receive the Unicast frame transmitted via the second communication path from the first communication device based on the protocol having the re-transmission processing.

With the structure, the first communication device selects the Multicast frame of the content from the first communication path, converts the Multicast frame into the Unicast frame, and transmits the Unicast frame to the second communication device via the second communication path, so that it is possible to realize a system as high-quality Multicast communication even when the communication is performed wirelessly.

Note that the "content" includes not only programs but also any kinds of data. Note also that "Unicast via wireless communication path" means wireless point-to-point communication and is assumed to perform the re-transmission processing if the communication fails. On the other hand, Multicast means point-to-multipoint communication and the re-transmission processing is not performed.

Note that the present invention is realized not only as the communication system, but also can be realized as a method for controlling the communication system (hereinafter, referred to as a communication method).

Furthermore, the present invention can be realized as a transmitting device and a receiving device included in the communication system.

Still further, the present invention can be realized as a method for controlling the transmitting device (hereinafter, referred to as a transmitting method), a program for causing a computer system and the like to execute the transmitting method, a recording medium for recording a transmitted program, and the like.

Still further, the present invention can be realized as a system LSI which is included in the transmitting device to realize the transmitting function, an IP core which implements the transmitting function in the system LSI (hereinafter, referred to as a transmitting core), and a recording medium which records the transmitting core.

Still further, the present invention can be realized as a method for controlling the receiving device (hereinafter, referred to as a receiving method), a receiving program for causing a computer program and the like to execute the receiving method, a recording medium for recording a received program, and the like.

Furthermore, the present invention can be realized as a system LSI which is included in the receiving device to realize the receiving function, an IP core which implements the receiving function in the system LSI (hereinafter, referred to as a receiving core), and a recording medium which records the receiving core.

According to the communication device and the communication system of the present invention, by using processing at the Network layer and the Data link layer, it is possible to realize a system as high-quality Multicast system even based on a protocol for performing re-transmission processing as a network protocol. This means that by using a wireless LAN which is basically used for Unicast transmission, a Multicast system which implements high-quality video transmission and the like is realized. Furthermore, the present invention is realized by using systems at the Network layer and the Data link layer, thereby not restricting a protocol used at the Transport layer, so that it is possible to use at the Transport layer a protocol depending on the system. Note that IP Multicast is generally used at the Network layer in the Multicast communication, but any other protocols can be used at the Network layer as far as the Multicast communication can be performed using the protocols.

Moreover, the communication device based on a standard of general-purpose wireless communication such as IEEE802.11 standard can be directly used in the present invention, so that it is possible to structure a system at low cost.

Further, by efficiently performing the communication by effectively using transmission bands in the wireless LAN for which the bands are restricted, it is possible to realize high-quality program distribution.

Furthermore, by using the wireless communication path, wiring becomes no more necessary, so that installation construction can be eliminated. Still further, in a system especially in an airplane and the like, wiring of an inadequate short length is off course problematic, but wiring of a redundant length also faces space constraints. Still further, used cables need to have a length which is a precisely equivalent to a distance between devices and also need to be provided with measures for undesired radiation. Therefore, by avoiding use of quite expensive cables only for airplanes and reducing wiring, the significant advantages on the cost can be gained.

Moreover, the present invention is effective even in a part where the Multicast frame needs to be duplicated at a part of communication using a wireless communication path.

In addition, the present invention does not need to change a protocol in a wireless communication part, thereby enabling to use a standard wireless devices, so that it is possible to structure a simple and inexpensive system and device.

BRIEF DESCRIPTION OF DRAWINGS

FIG. 10A is a schematic block diagram of program distribution frames.

FIG. 10B is a schematic block diagram of a distribution frame in which program data are multiplexed.

NUMERICAL REFERENCES

100 program distribution unit (video server)
101 first communication path
102 first communication unit (wireless access point)
103 second communication path
104 second communication unit
105 user terminal

DETAILED DESCRIPTION OF THE INVENTION

First Embodiment

The following describes the first embodiment according to the present invention with reference to the drawings. Note that, in general, an unit to be transmitted via a network is called a frame for the Data link layer and an IP data gram for the Network layer, but in the description, the both units are referred to as a frame.

Figure 4:
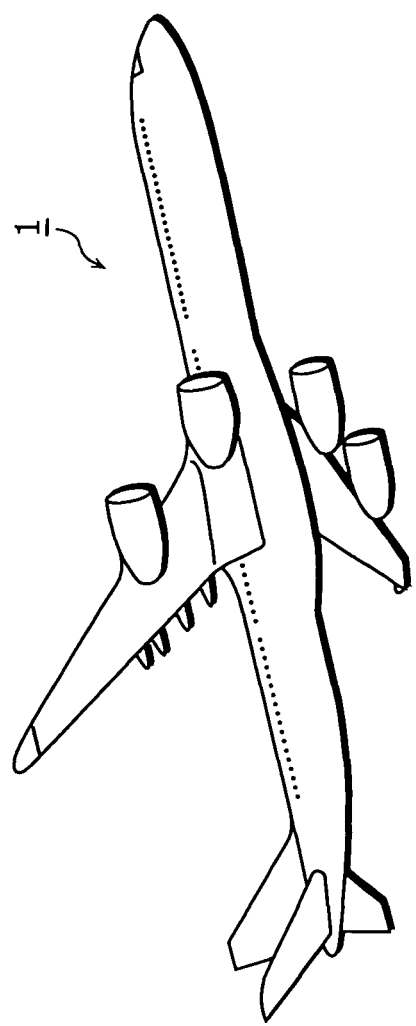
FIG. 4 is a diagram showing an airplane in which a program distribution system according to the first embodiment of the present invention is equipped.
Figure 5:
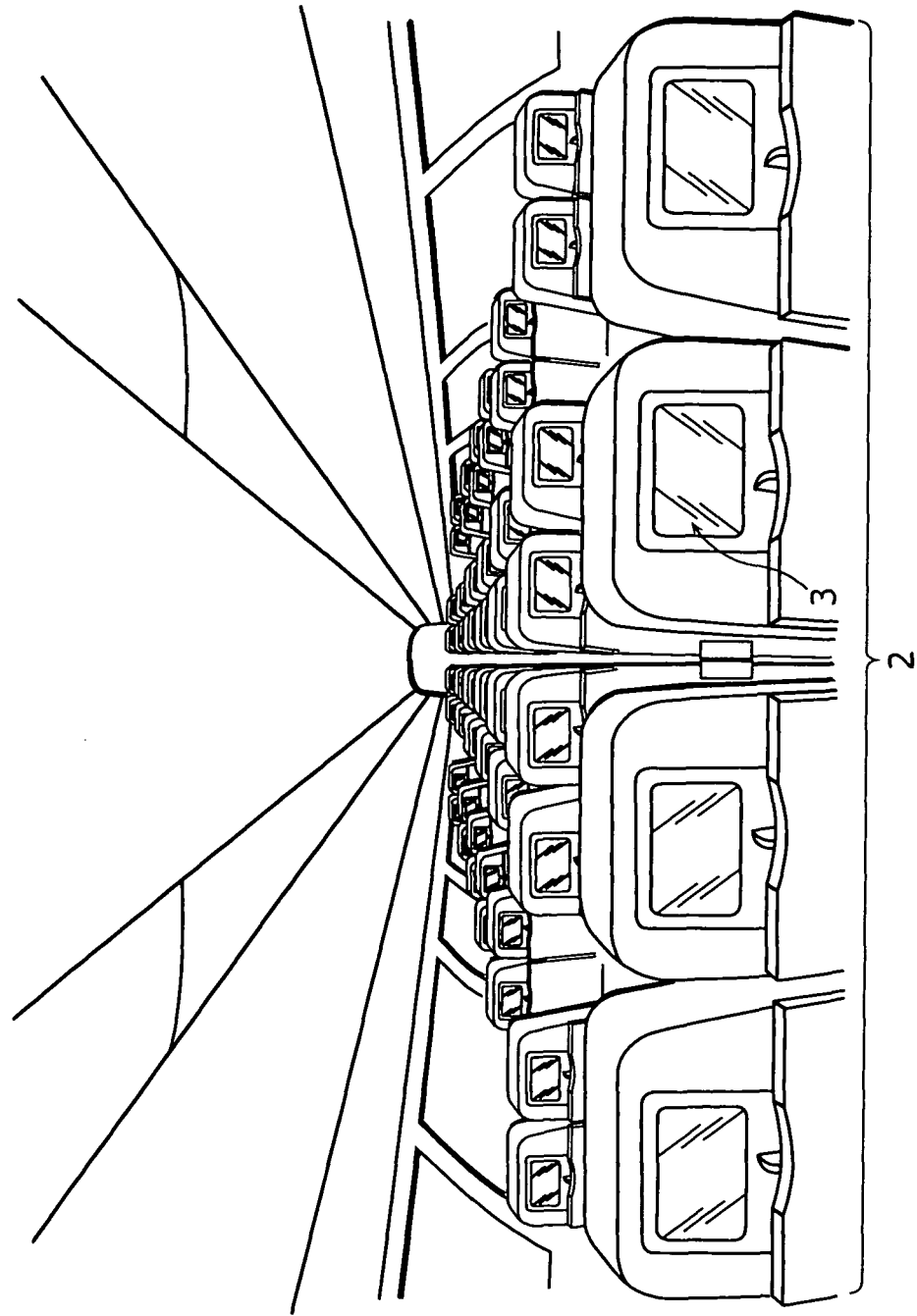
FIG. 5 is a diagram showing inside of the airplane in which the program distribution system according to the first embodiment of the present invention is equipped.

A data distribution system according to the present embodiment is used in an airplane 1 as shown in FIG. 4 as one example. In the data distribution system used in the airplane (hereinafter, referred to as an airplane program distribution system), as shown in FIG. 5, video programs and the like distributed from a video server 10 shown in FIG. 6 can be watched and listened by using a monitor 3 equipped on the back of each seat 2.

Figure 6:
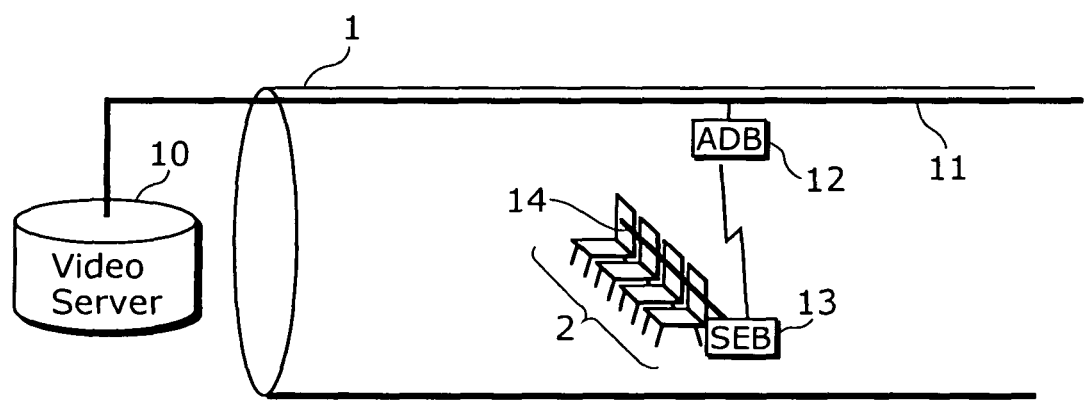
FIG. 6 is a diagram showing wiring in the airplane in which the program distribution system according to the first embodiment of the present invention is equipped.

In general, airplanes have constraints on a space to be equipped with communication devices or wires. For example, as shown in FIG. 6, an area distribution box (ADB) 12 is equipped on a ceiling part of the airplane 1. A main line 11 is wired along the ceiling. The monitor 3 is equipped on the back of each seat 2. A seat electric box (SEB) 13 is equipped on one of a set of seats in a row. Here, for example, the SEB 13 is equipped on one of the four seats 2 in a row, and a wire 14 wires directly from the SEB 13 to the four user terminals 3. Wiring from the ADB 12 to the SEB 13 are not equipped along a wall of the airplane, but connected by an antenna (wireless).

Note that, currently, from the SEB to each user terminal, data has been transmitted via a transmission cable such as the Ethernet, so that additional power cables have been used for the terminals, but if, in addition to the above wireless transmission from ADB to SEB, a power line carrier communication (PLC) for transmitting data via power lines is also used, the communication cables can be eventually reduced, so that it is possible to reduce wiring.

Thereby communication using a wireless LAN can be performed in the airplane, and wiring for wireless LAN segments becomes unnecessary, so that wiring construction in the airplane can be significantly reduced. Therefore, it is not necessary to use expensive cables only for airplanes so that a cost can be reduced. Furthermore, in addition to the program distribution, it is also possible to realize connection between the Internet and a computer which a user brings into the airplane.

Moreover, there is good visibility in a ceiling and under a floor, so that it is possible to equip wires there. In general, the wires are equipped mainly in a ceiling. Further, regarding the seat, a plurality of seats are connected together, and each seat is physically near to another seat, so that the wires can be equipped between the seats in these connected seats beforehand. Furthermore, based on demands from customers for each flight, airline companies often change an layout of the seats, for example, a distance between the seats, a ratio of business class seats to economy class seats, and so on. Still further, the airline companies earn profits by running the airplanes so that a parking time should be as short as possible and within the parking time the seat layout needs to be changed. In addition, generally, if the wires from the ADB in the ceiling through the wall to the SEB under the seat is equipped not to be exposed to a cabin for safety, it is difficult to change the wiring in the wall every time the seat layout is changed, and if a large number of wires are reserved beforehand, a cost for wiring is necessary and fuel consumption of the airplane is increased due to increased weight of the body.

On the other hand, the airplane data distribution system according to the present invention can change the sheet layout flexibly. Further, the seat layout change does not need large wiring change. Still further, it is not necessary to preserve extra wires for a plurality of seat layout patterns, so that the wiring cost is not occurred and a weight of the airplane body is not increased.

Based on the above aspects, the following describes the airplane data distribution system (hereinafter, referred to as a data distribution system) according to the first embodiment.

Figure 7:
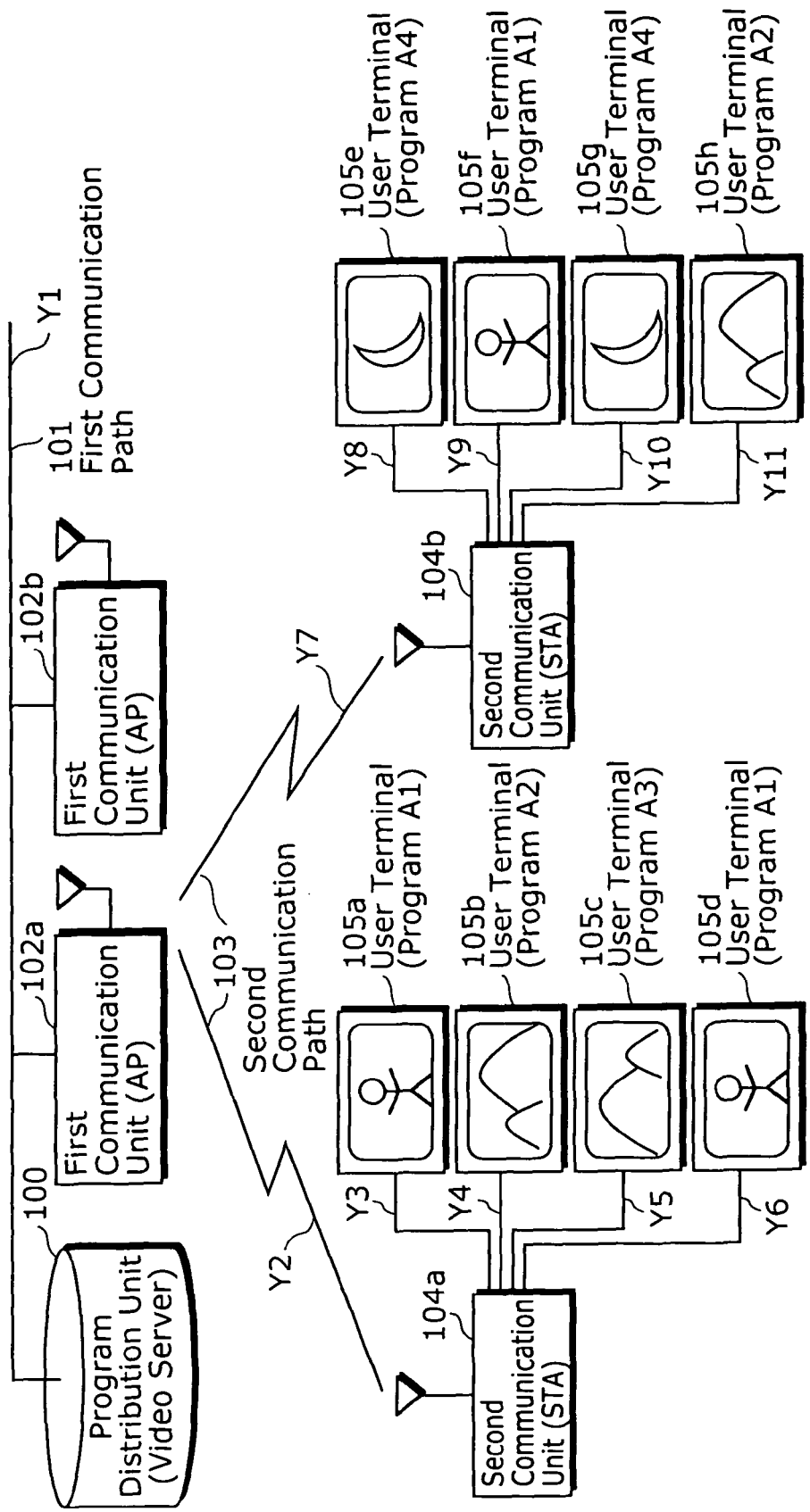
FIG. 7 is a diagram of a structure of a Multicast communication system according to the present invention.

FIG. 7 is a diagram of a structure of a Multicast communication system according to the present invention. In FIG. 7, a reference numeral 100 represents a program distribution unit, and the first embodiment shows, as an example, a video server for distributing video programs which is an example of contents. A reference numeral 101 represents the first communication path, and in the first embodiment the first communication path is assumed to be a gigabit Ethernet®. A reference numeral 102 represents the first communication unit, and in the first embodiment the first communication unit is assumed to be a router having a wireless access point (hereinafter, AP) based on IEEE 802.11. A reference numeral 103 represents the second communication path, and in the first embodiment the second communication path is assumed to be a wireless communication path based on IEEE802.11. A reference numeral 104 represents the second communication unit, and in the first embodiment the second communication unit is assumed to be a router having a wireless station (hereinafter, referred to as a STA) function based on IEEE802.11. A reference numeral 105 represents a user terminal, and in the first embodiment the user terminal is assumed to be used by a user to watch and listen to a video program and to have a function of selecting the video program which the user wishes to watch and listen to. Note that, in convenience of explanation, numeral references of the user terminals 105 are added with characters a, b, c, d, e, f, g, and h, respectively. The AP 102 can communicate with one or more STA 104. FIG. 7 shows an example in which a single AP 102a communicates with two STA 104a and STA 104b. An AP 102b communicates, for example, using another wireless channel different from the channel used by the AP 102a, to distribute programs to another second communication unit 104 (not shown).

Note that the program distribution unit 100 is the video server 10 in FIG. 6. The first communication path 101 is the main line 11 in FIG. 6. The first communication unit 102 is the ADB 12 in FIG. 6. The second communication path 103 is the antenna in FIG. 6. The second communication unit 104 is the SEB 13 in FIG. 6. The user terminal 105 is the monitor 3 in FIG. 5.

Hereinafter, "Unicast" means point-to-point communication. "Multicast" means point-to-multipoint communication. "Wireless Unicast (Unicast via wireless communication path)" means point-to-point communication via wireless communication path. Note that, in the wireless Unicast, an ACK frame is sent back from a destination. Note also that if the ACK frame is not sent back within a predetermined time period, re-transmission processing is performed. "Wireless Multicast" (Multicast via wireless communication path)" means point-to-multipoint communication via a wireless communication path. Note that, in the wireless Multicast, an ACK frame is not sent back from a destination, so that re-transmission processing cannot be performed.

The first communication unit 102a in the first embodiment transmits data to multiple destinations by the wireless Unicast, instead of the wireless Multicast. Thereby even if the data to be transmitted to a plurality of recipients is transmitted to a plurality of destinations, the re-transmission function can examine whether or not the data is received by the destinations, so that it is possible to realize reliable communication.

More specifically, as shown in FIG. 7, all programs are distributed from the program distribution unit 100 via the first communication path 101. An IP Multicast technology is applied to the program distribution via the communication path 101, for example. In the first embodiment, a Multicast IP address 224.0.1.1 is used for the program A1, a Multicast IP address 224.0.1.2 is used for the program A2, a Multicast IP address 224.0.1.3 is used for the program A3, and a Multicast IP address 224.0.1.4 is used for the program A4. Note that the "Multicast IP address" means an IP address assigned to each Multicast group.

The second communication path 104 is a wireless LAN. In order to simultaneously distribute a single program to a plurality of STAs, since the IP Multicast uses addresses to be transmitted to the groups, it is necessary to use Multicast MAC addresses even in the processing at a MAC layer in order to enable a plurality of STAs to receive data, but as described above, in the case where the Multicast MAC address is used at the MAC layer, the re-transmission processing is not performed, so that in the first embodiment, the IP processing at the Network layer is performed by Unicast, and the MAC layer performs Unicast communication, thereby establishing high-quality communication by using the re-transmission processing.

Note that the above method is one example, and it is also possible that the Multicast IP addresses are directly used at the Network layer and the Unicast MAC address are used only at the MAC layer.

Figure 1:
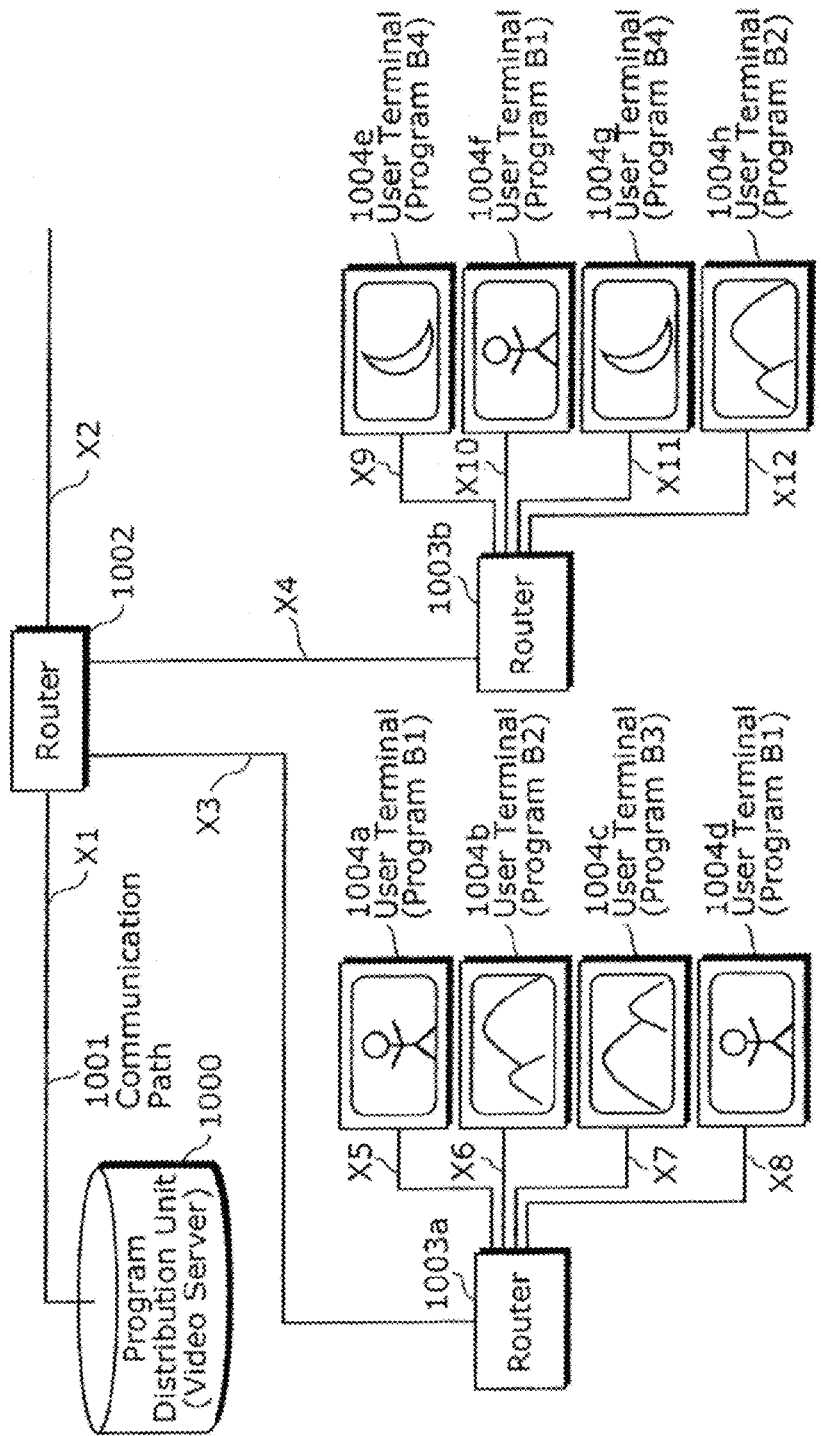
FIG. 1 is a diagram showing a schematic structure of a conventional program distribution system using IP Multicast communication.
Figure 2:
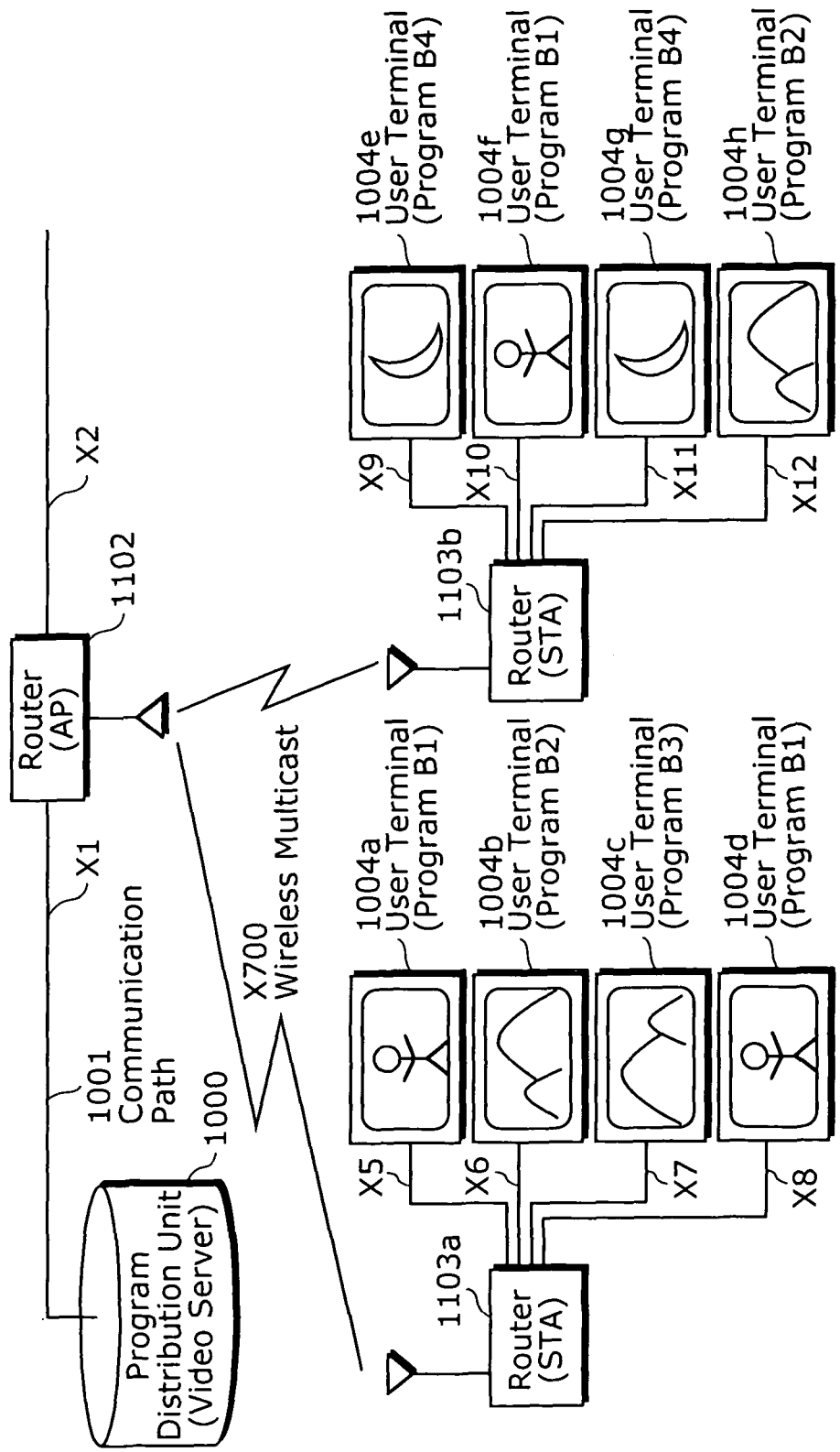
FIG. 2 is a schematic block diagram of IP Multicast communication using wireless communication on the middle of a transmission path.
Figure 3:
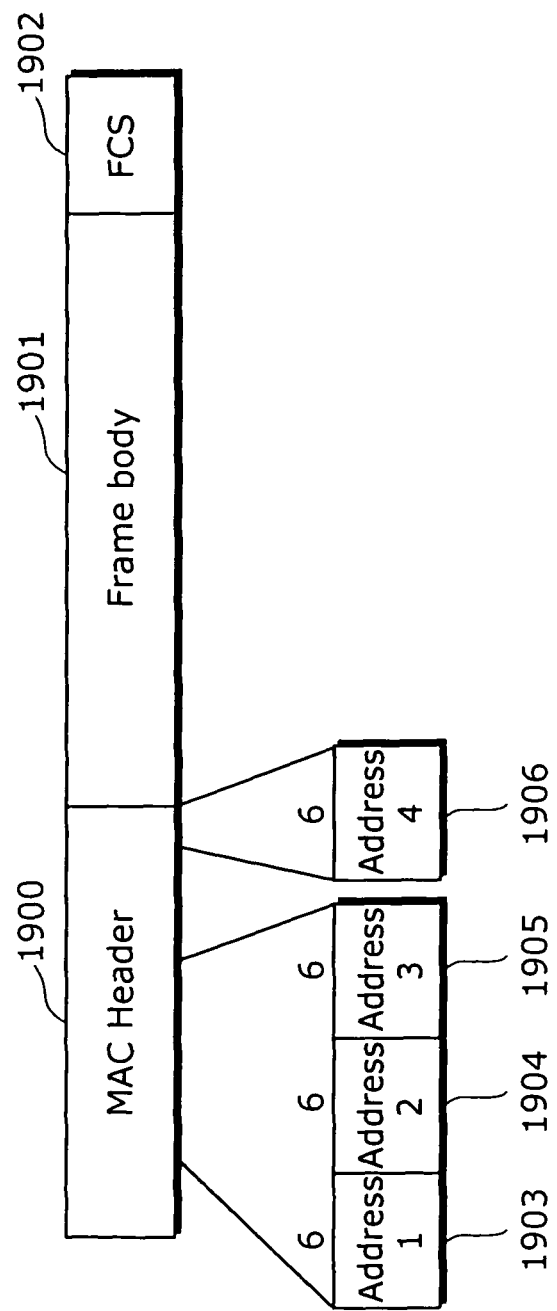
FIG. 3 is a schematic block diagram of a MAC frame.

Note also that, in order to perform the Multicast communication at the MAC layer during the communication from the AP to the STA, the Multicast MAC address is used as the address 1 (1903) in FIG. 3. Note that the "Multicast MAC address" means a MAC address which is generated from the Multicast IP address.

The user terminal 105 selects a program which the user wishes to watch or listen to and notifies the second communication unit 104 of the program. FIG. 7 shows one example in which the user terminal 105a and the user terminal 105d select a program A1, the user terminal 105b selects a program A2, and the user terminal 105c selects a program A3. In other words, the four user terminals 105 managed by the second communication unit 104 shown in FIG. 7 select totally three programs.

The program selection by each user terminal is transmitted to the first communication unit 102a via the second communication unit 104a based on the IGMP. Here, the second communication unit 104a, off course, stores information regarding which program each user terminal 105 requires to be watched and listened to. The first communication unit 102a transfers, based on the IGMP, to the second communication unit 104a the three programs selected by the user terminals 105a to 105d (programs A1, A2, and A3) among ten programs which are transmittable by the Multicast via the first communication path 101. This means that, via a Y2, bands only for streams of the three programs are used. Here, in the second communication path, the transmission of the three programs can be realized not by the Multicast, but by transmitting each program by the Unicast.

More specifically, the second communication unit 104a transmits to the second communication unit 104a a frame (program A1) of a Multicast IP address 224.0.1.1, a frame (program A2) of a Multicast IP address 224.0.1.2, and a frame (program A3) of a Multicast IP address 224.0.1.3, each of which are transmitted via the first communication path 101. Here, the above Multicast IP addresses are not used as IP addresses, but Unicast IP addresses are used as IP addresses. For example, the Unicast communication is performed by using an address 133.181.127.200 as a source address to the first communication unit 102a, and using an address 133.181.127.201 as a destination address to the second communication unit 104a. Here, as the address 1 (1903 in FIG. 3) of the MAC address, the Unicast MAC address such as 00:80: 45:0F:03:00, for example, is used. This means that the MAC address of the second communication unit 104a is used as a destination address. By communicating using Unicast in a MAC level of wireless communication, the re-transmission processing is performed, so that it is possible to achieve high-quality transmission. Note that the "Unicast MAC address" means a MAC address assigned to a network interface of a node. Note also that the "Unicast IP address" means an IP address assigned to the network interface of the node.

Thereby, the second communication unit 104b cannot recognize even the MAC address as a frame addressed to the second communication unit 104b, and an IP address 133.181.127.202 is assigned to the second communication unit 104b. Therefore, the user terminal 105f requires a program A1 to be watched and listened to, and the user terminal 105h requires a program A2 to be watched and listened to, but the second communication unit 104b cannot recognize the transmission to the second communication unit 104a as transmission eventually to the second communication unit 104b, so that the first communication unit 102a does not need to perform the re-transmission processing.

On the other hand, in a case where the first communication unit 102a transmits the program A2 to the user terminal 105f and the user terminal 105h by using the IP address assigned to the second communication unit 104b, the first communication unit 102a communicates with the second communication unit 104b by using the Unicast communication. Then, the program A2 is transmitted via the second communication unit 104b to the user terminal 105f and the user terminal 105h. Note that other programs are transmitted in the same manner. Further, the Unicast communication is performed to distribute programs which have been transmitted by the Multicast, by using a MAC address of the STA or the AP, namely, a MAC address of a destination, also in the case of other STAs or APs belonging to wireless node segments in the first communication unit 102a, except the second communication unit 104a and the first communication unit 104b. Furthermore, in a case where an identical program is simultaneously transferred to a plurality of destinations, the program is duplicated and the duplicated program is transferred to the destination.

The second communication unit 104a transfers the program A1 to the user terminal 105a and the user terminal 105d, the program A2 to the user terminal 105b, and the program A3 to the user terminal 105c. Off course, via Y3, Y4, Y5, and Y6, data for one program is transmitted. Here, the address can be converted again to the Multicast IP address, or the Unicast IP address can be used. Furthermore, protocols besides the IP can be used.

That is, in the first embodiment, IP Multicast communication is performed from the video server 100 to the first communication path, then the communication is changed to Unicast communication from the first communication unit 102 to the second communication unit 104 both at the Network layer and at the Data link layer, and finally Multicast communication is performed again from the second communication unit 104 to each user terminal 105. In the second communication unit 104, in a case where a plurality of the user terminals require an identical program to be watched and listened to, the program are duplicated in the same manner as the IP Multicast, but the IP is not necessarily used from the second communication unit 104 to each user terminal, and the protocol may be an original protocol such as the PLC or dedicated lines. Note that the protocol used at the Transport layer is not limited to the above.

The communication from the first communication unit 102a to the second communication unit 104b is Unicast communication in which 133.181.127.200 is used as an address of a source that is the first communication unit 102a, and 133.181.127.202 is used as an address of a destination that is the second communication unit 104a. It is assumed that the MAC address at the MAC layer is a Unicast MAC address. In other words, the programs A1, A2, and A4 are transmitted by Unicast communication. Here, the second communication unit 104a does not recognize a frame addressed to the second communication unit 104b as an address eventually to the second communication unit 104a, so that the re-transmission processing is not performed.

Figure 8:
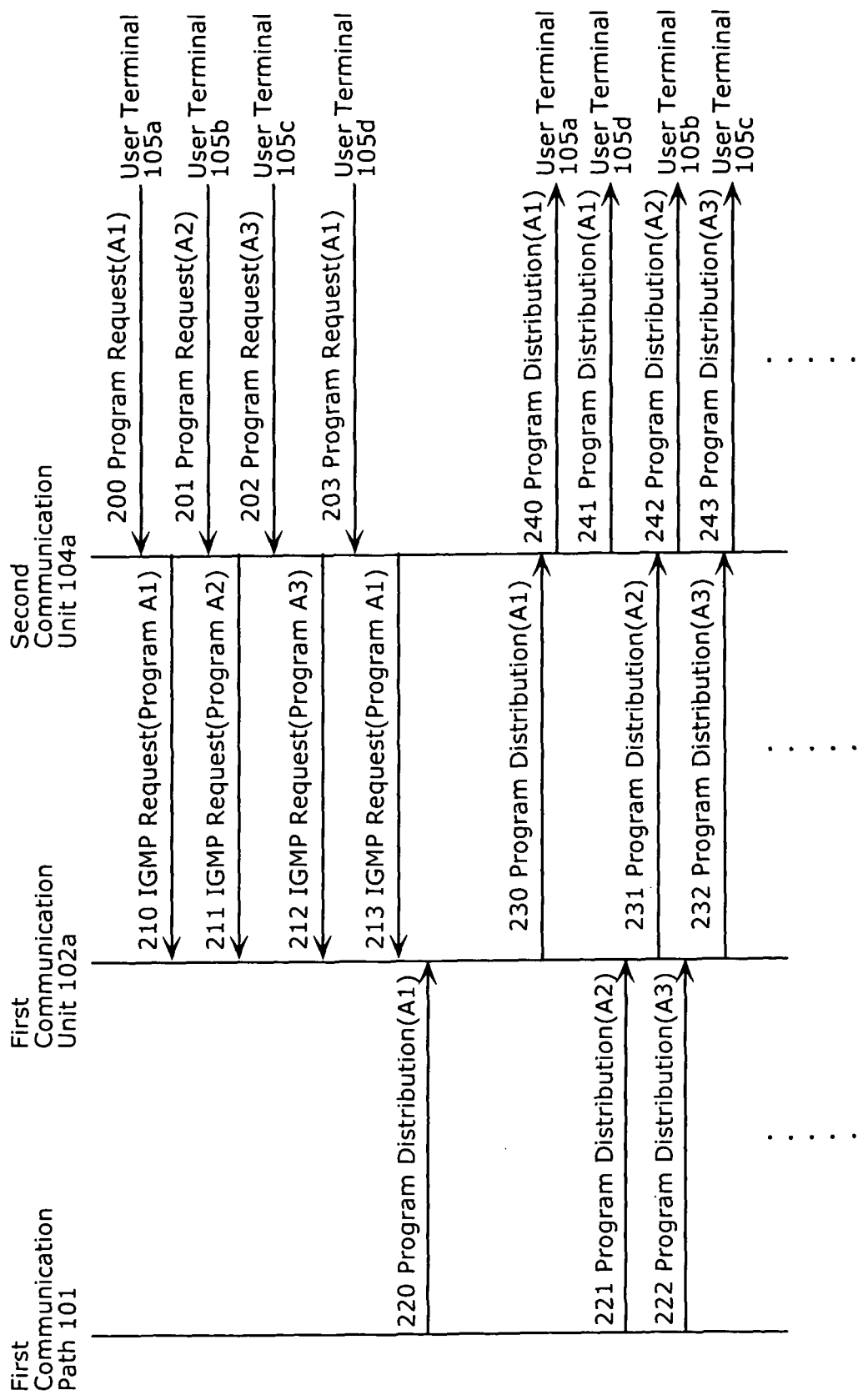
FIG. 8 is a diagram showing one example of processing according to the present invention.

FIG. 8 is a diagram showing one example of the processing according to the present invention. In FIG. 8, the description is given only for processing performed by the second communication unit 104a.

Firstly, as a program request 200, the user terminal 105a requests the second communication unit 104a for the program A1. The second communication unit 104a receives the program request 200, and, as an IGMP request 210, requests the first communication unit 102a to distribute the program A1.

Next, as a program request 201, the user terminal 105b requests the second communication unit 104a for the program A2. The second communication unit 104a receives the program request 201, and, as an IGMP request 211, requests the first communication unit 102a to distribute the program A2.

Further, as a program request 202, the user terminal 105c requests the second communication unit 104a for the program A3. The second communication unit 104a receives the program request 202, and, as an IGMP request 212, requests the first communication unit 102a to distribute the program A3.

Still further, as a program request 203, the user terminal 105d requests the second communication unit 104a for the program A1. The second communication unit 104a receives the program request 203, and, as an IGMP request 213, requests the first communication unit 102a to distribute the program A1.

The first communication unit 102a which receives the distribution requests of the programs A1, A2, and A3 by the IGMP request selects only frames of the programs A1, A2, and A3 among all program frames transmitted by IP Multicast via the first communication path 101, and distributes the selected frames to the second communication unit 104a. The processing is described in more detail with reference to FIG. 8. The first communication unit 102a obtains a program frame 220 (program A1) which is transmitted using a Multicast IP address 224.0.1.1 via the first communication path 101, and at a program distribution 230, transmits from the first communication unit 102a to the second communication unit 104a the obtained frame as an Unicast frame having a source address 133.181.127.200 and a destination address 133.181.127.201 (a Unicast MAC address is also used as a MAC address). Since the program A1 is requested by the user terminals 105a and 105d to be watched and listened to, the second communication unit 104a duplicates the transmitted frame, then distributes the duplicated programs to the user terminal 105a at a program distribution 240 and to the user terminal 105d at a program distribution 241.

In the same manner, the first communication unit 102a obtains a program frame 221 (program A2) which is transmitted using a Multicast IP address 224.0.1.2 via the first communication path 101, and at a program distribution 231 transmits from the first communication unit 102a to the second communication unit 104a the obtained program frame as an Unicast frame having a source address 133.181.127.200 and a destination address 133.181.127.201 (a Unicast MAC address is also used as a MAC address). Since the program A2 is requested by the user terminal 105d to be watched and listened to, the second communication unit 104a distributes the program to the user terminal 105b at a program distribution 242.

In the same manner, the first communication unit 102a obtains a program frame 222 (program A3) which is transmitted using a Multicast IP address 224.0.1.3 via the first communication path 101, and at a program distribution 232 transmits from the first communication unit 102 to the second communication unit 104a the obtained program frame as an Unicast frame having a source address 133.181.127.200 and a destination address 133.181.127.201 (a Unicast MAC address is also used as a MAC address). Since the program A3 is requested by the user terminal 105c to be watched and listened to, the second communication unit 104a distributes the program to the user terminal 105b at a program distribution 243.

In other words, every time the first communication unit 102a detects from the first communication path 101 the program frames which the user terminals 105a to 105d managed by the second communication unit 104a request to be watched and listened to, the first communication unit 102a obtains the frames and distributes the program to the second communication unit 104a, and then the second communication unit 104a distributes the programs to each user terminal 105. Such processing is repeated to transmit the program frames which the user terminals request.

Note that, FIG. 8 shows a case where the program requests 200 to 203 by the user terminals 105a to 105d are performed almost simultaneously, but FIG. 8 shows merely one example, and the timings of the program requests depend on when the users wish to watch and listen to the program, so that the program requests are not always performed at the same time.

Furthermore, the transmission of each program frame via the first communication path 101 is not repeated in an order from the program A1, A2, and A3, for example, but an amount of data in the frame depends on the program, so that the order of the frame transmission is not limited to the above. However, the second communication unit 102a obtains a frame of the program to be distributed every time of detecting the frame, and transmits the frame to the second communication unit 104a by using a system at the Network layer and the Data link layer, so that the present invention can be easily realized.

Figure 9:
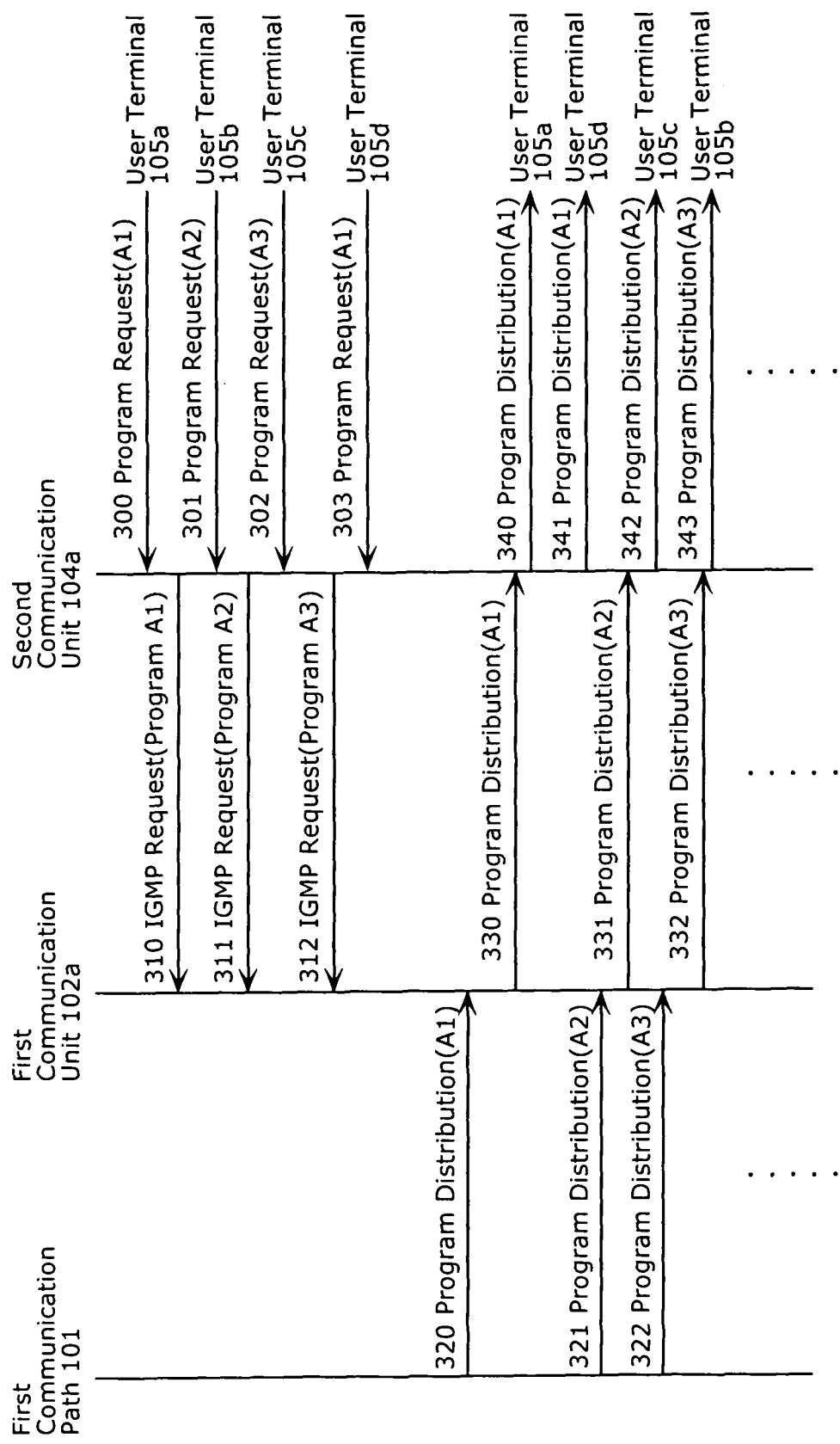
FIG. 9 is a diagram showing another example of the processing according to the present invention.

FIG. 9 is a diagram showing one example of the processing according to the present invention. With reference to FIG. 9, another method which is different from the method described with reference to FIG. 8 is described. The method described with reference to FIG. 9 differs from the method described with reference to FIG. 8 in that, in a case where, at the IGMP request from the second communication unit 104a to the first communication unit 102a, the user terminals 105 request an identical program to be watched and listened to, in the method described with reference to FIG. 8 the second communication unit 104a transmits, to the first communication unit 102a, a program request of the user terminal 105 as an IGMP request, but in the method described with reference to FIG. 9, the second communication unit 104a absorbs a program request from the user terminal 105, and if the same program is further requested, the second communication unit 104a transmits an IGMP request only once to the first communication unit 102a. The following describes the processing in more detail.

Firstly, as a program request 300, the user terminal 105a requests the second communication unit 104a for the program A1. The second communication unit 104a receives the program request 300, and, as an IGMP request 310, requests the first communication unit 102a to distribute the program A1.

Next, as a program request 301, the user terminal 105b requests the second communication unit 104a for the program A2. The second communication unit 104a receives the program request 301, and, as an IGMP request 311, requests the first communication unit 102a to distribute the program A2.

Further, as a program request 302, the user terminal 105c requests the second communication unit 104a for the program A3. The second communication unit 104a receives the program request 302, and, as an IGMP request 312, requests the first communication unit 102a to distribute the program A3.

Still further, as a program request 303, the user terminal 105*d* requests the second communication unit 104*a* for the program A1. Here, the second communication unit 104*a* has already received the program request for the program A1 from the user terminal 105*a* at the program request 300 and has issued the IGMP request for the program A1 to the first communication unit 102, so that the second communication unit 104*a* does not issue a further IGMP request for the program A1. This means that the second communication unit 104 uses the program request 303 only to learn that the user terminal 105*d* also requests the program A1.

The processing from which the program distribution 320 is issued is the same as the processing described with reference to FIG. 8. More specifically, the program distribution 320 is the same as the program distribution 220, a program distribution 330 is the same as the program distribution 230, a program distribution 340 is the same as the program distribution 240, a program distribution 341 is the same as the program distribution 241, a program distribution 321 is the same as the program distribution 221, a program distribution 331 is the same as the program distribution 231, a program distribution 342 is the same as the program distribution 242, a program distribution 322 is the same as the program distribution 222, a program distribution 332 is the same as the program distribution 232, and a program distribution 343 is the same as the program distribution 243.

Here, it is important that an IGMP request is not performed for the program request 303, but, the second communication unit 104*a* recognizes that not only the user terminal 105*a* but also the user terminal 105*d* requests for the program A1, so that the second communication unit 104*a* distributes, at the program distribution 341, a frame of the program A1 obtained from the program distribution 330 to the user terminal 105*d*.

Figure 14:
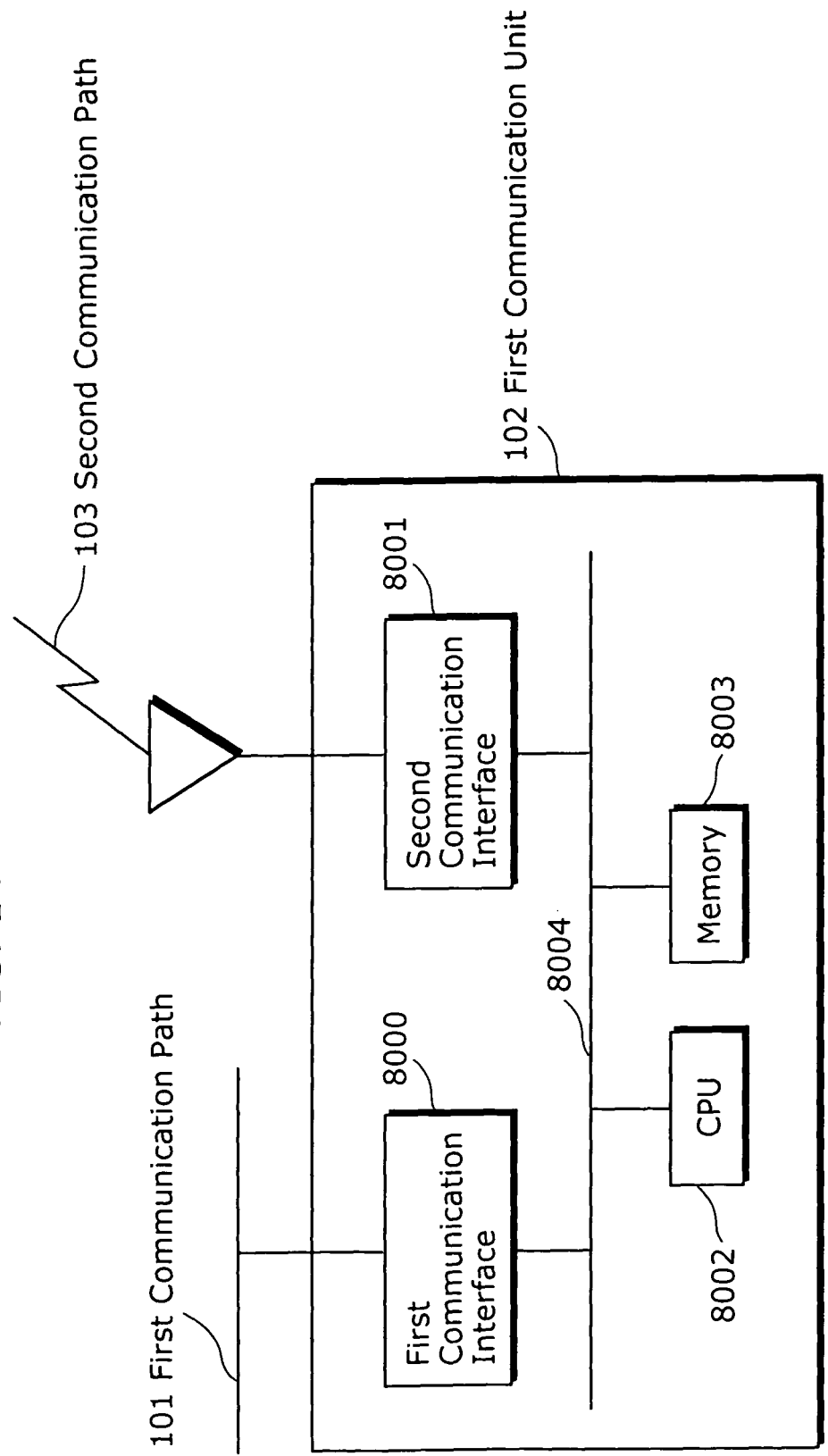
FIG. 14 is a schematic block diagram of an internal structure of the first communication unit.

FIG. 14 is a schematic block diagram of an internal structure of the first communication unit. In FIG. 14, the first communication path 101 and the second communication path are identical with the respective paths shown in FIGS. 7 and 12. A reference numeral 8000 represents the first communication path interface, and in the first embodiment the first communication path interface is assumed to be a component for performing interface processing of an Ethernet®. A reference numeral 8001 represents the second communication path interface and in the first embodiment the second communication path interface is assumed to be a wireless interface based on IEEE802.11 standard for performing the re-transmission processing. A reference numeral 8002 represents a CPU. A reference numeral 8003 represents a memory. A reference numeral 8004 represents a bus for exchanging data among the above components.

The first communication path interface 8000 can use a general-purpose component such as the Ethernet®. Furthermore, the second communication path interface 8001 can use a general-purpose component for wireless communication. The CPU 8002 and the memory 8003 can also use general-purpose components.

The present invention is characterized in software which is stored in the memory 8003 and is processed by the CPU 8002. More specifically, a frame of a requested program is received from the first communication path via the first communication path interface 8000, then temporarily stored in the memory 8003, after that, the frame is assigned with a Unicast IP address and a Unicast MAC address as described above, and transmitted via the second communication path interface 8001 to the second communication path 103.

Note that the CPU 8002 further performs the IGMP processing in order to request the program, but the software for processing the IGMP is based on IGMPv1 (RFC 1112), IGMPv2 (RFC 2236), and IGMPv3 (RFC 3376) standards.

Note also that the processing for obtaining the MAC address of the destination is generally performed by using wireless communication.

As described above, by using Unicast communication in the wireless communication where the re-transmission processing is performed, high-quality transmission is achieved by performing the re-transmission processing in the wireless communication, so that it is possible to realize a system as the Multicast communication. That is, in the Multicast by which service is provided originally using Broadcast communication without performing the re-transmission processing, it is possible to improve reliability of the communication by using the re-transmission function in an unreliable part of the wireless communication (with high error rate).

Furthermore, wiring becomes unnecessary by using the wireless communication, so that installation construction can be eliminated.

Note that in the first embodiment, the IGMP is used to request programs, but the method is not limited to the above as far as the program can be requested.

Note also that the AP does not necessarily have to have a router function, but the AP can have only a bridge function.

Note that in the first embodiment, both of the frame at the Network layer and the frame at the MAC layer are converted to the Unicast frames. However, the important aspect of the present invention is that reliability of the communication is improved by using the re-transmission function at the wireless MAC layer, so that at the Network layer, it is not necessarily to convert the frames to the Unicast frames. For example, even if at the Network layer the Multicast frame is further transmitted as an Unicast frame at the MAC layer, it is, of course, possible to realize the present invention. Thereby, any modifications do not depart from the scope of the present invention.

Second Embodiment

Figure 12:
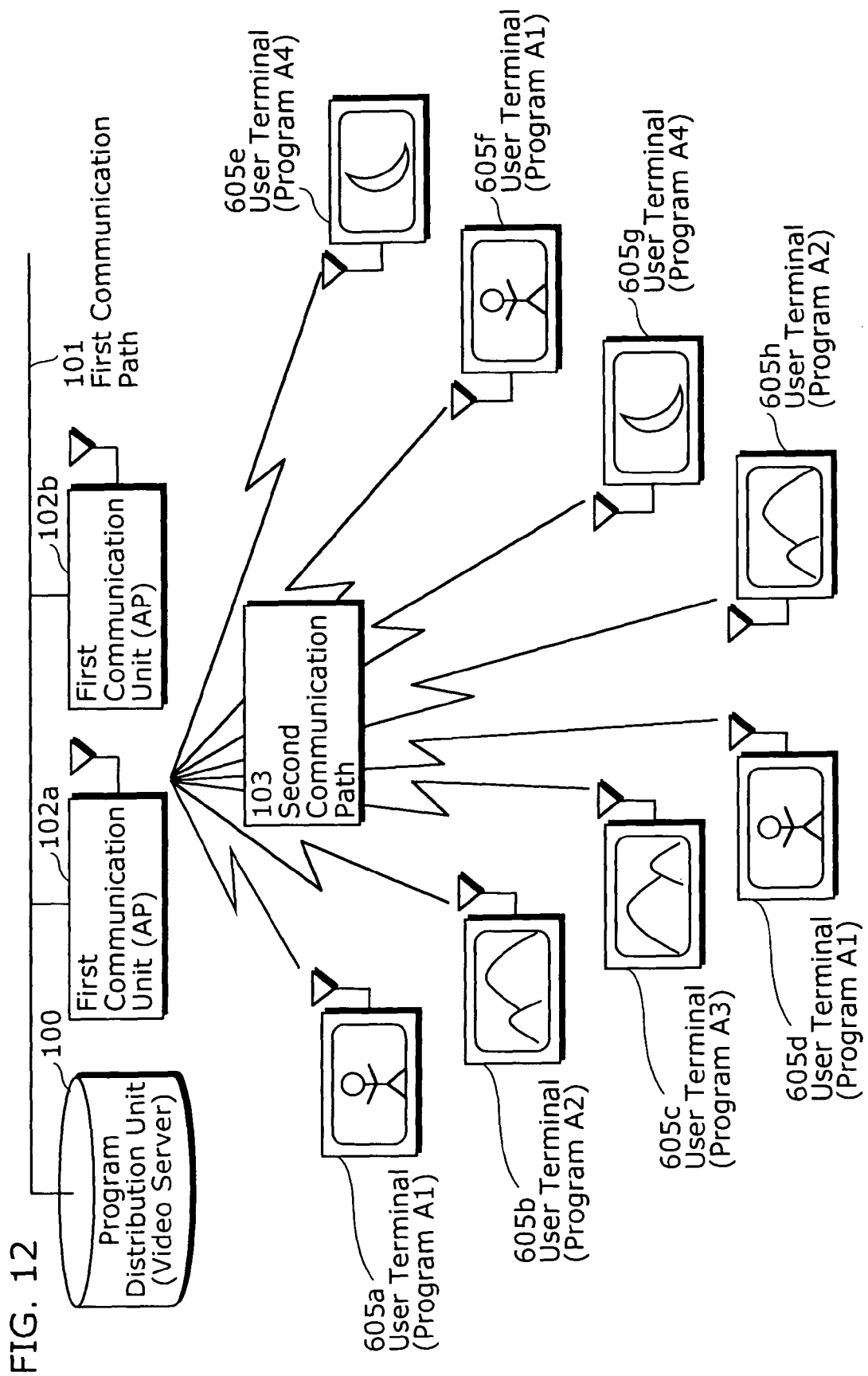
FIG. 12 is a diagram of a structure of the Multicast communication system according to the present application.

The second embodiment describes another example of the structure of the system which has been described with reference to FIG. 7. FIG. 12 is a diagram of a structure of the multicast communication according to the present application. In FIG. 12, a program distribution unit 100, the first communication path 101, and the first communication unit 102 are same as the respective units in FIG. 7. The system structure in FIG. 12 differs from the system structure in FIG. 7 in that a user terminal 605 has a function as a wireless station (STA). That is, the first communication unit (AP) 102*a* which is a wireless access point for wirelessly communicating directly with the user terminals 605*a* to 605*h*.

Figure 13:
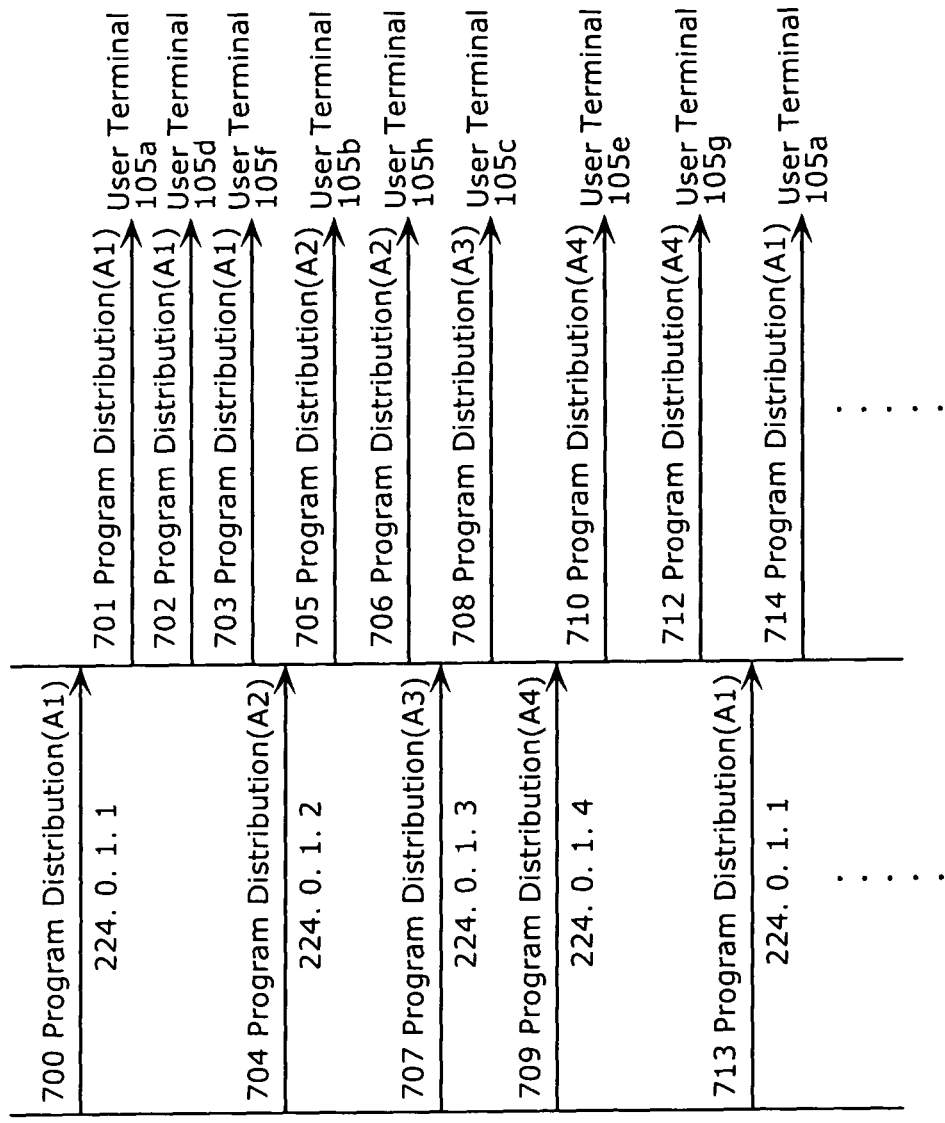
FIG. 13 is a diagram showing still another example of the processing according to the present invention.

FIG. 13 is a diagram showing one example of processing according to the present invention. The following describes the second embodiment with reference to FIGS. 12 and 13. Note that the IGMP processing is assumed to have already been performed between the user terminal and the first communication unit 102*a*, so that the IGMP processing is not shown in FIG. 13.

The first communication unit 102*a* obtains a program distribution 700 (program A1) which is transmitted using a Multicast IP address 224.0.1.1 via the first communication path 101, and at a program distribution 701, distributes to the user terminal 105*a* the obtained program as a Unicast frame having a source address 133.181.127.200 and a destination address 133.181.127.210. Then, the first communication unit 102*a* duplicates the program, and at a program distribution 702, distributes to the user terminal 105*d* the duplicated program as a Unicast frame having a destination address 133.181.127.213. The first communication unit 102a further duplicates the program, and at a program distribution 703, distributes to the user terminal 105f the duplicated program as a Unicast frame having a destination address 133.181.127.215.

Next, the first communication unit 102a, obtains a program distribution 704 (program A2) which is transmitted using a Multicast IP address 224.0.1.2 via the first communication path 101, and at a program distribution 705, distributes to the user terminal 105b the obtained program as a Unicast frame having a source address 133.181.127.200 and a destination address 133.181.127.211. Then, the first communication unit 102a duplicates the program, and at a program distribution 706, distributes to the user terminal 105h the duplicated program as a Unicast frame having a destination address 133.181.127.217.

Next, the first communication unit 102a, obtains a program distribution 707 (program A3) which is transmitted using a Multicast IP address 224.0.1.3 via the first communication path 101, and at a program distribution 708, distributes to the user terminal 105c the obtained program as a Unicast frame having a source address 133.181.127.200 and a destination address 133.181.127.212.

Next, the first communication unit 102a obtains a program distribution 709 (program A4) which is transmitted using a Multicast IP address 224.0.1.4 via the first communication path 101, and at a program distribution 710, distributes to the user terminal 105e the obtained program as a Unicast frame having a source address 133.181.127.200 and a destination address 133.181.127.214. Then, the first communication unit 102a duplicates the program, and at a program distribution 712, distributes to the user terminal 105g the duplicated program as a Unicast frame having a destination address 133.181.127.216.

The subsequent processing is that, as shown at the program distributions 713 and 714, every time a IP Multicast frame of a program which the user terminal managed by the first communication unit 102a requests to be distributed to be watched or listened to is transmitted via the first communication path 101, the frame is converted to a Unicast frame to be transmitted during wireless communication via the second communication path 103 at the Network layer.

Note that, here, a Unicast IP address is used as the MAC address at the MAC layer processing in the same manner as described in the first embodiment. Thereby the re-transmission processing is performed in a wireless part of the communication, so that it is possible to realize high-quality transmission.

Processing performed by the first communication unit 102 in the above case is realized in the same manner as described in the first embodiment with reference to FIG. 14. This means that processing performed by software for changing the IP address and the MAC address is changed to be performed in the user terminal, not in the second communication unit.

By the processing as described above, it is possible to realize the Multicast system as a whole system.

Note that, in FIG. 13, an order of transmitting the program distributions are one example, and the transmission order can be changed appropriately by using buffers and the like, so that other transmission orders except the order shown in FIG. 13 do not depart from the scope of the present invention.

Note that in the second embodiment, both of the frame at the Network layer and the frame at the MAC layer have been converted to the Unicast frame. However, the important aspect of the present invention is that reliability of the communication is improved by using the re-transmission function at the wireless MAC layer, so that at the Network layer, it is not necessarily to convert the frames to the Unicast frame. For example, even if at the Network layer the Multicast frame is further transmitted as a Unicast frame at the MAC layer, it is, of course, possible to realize the present invention. Thereby, any modifications do not depart from the scope of the present invention.

Third Embodiment

The third embodiment describes a method by which the IP Multicast frame is used directly at the Network layer, and the re-transmission processing is performed in the wireless communication, so that it is possible to realize high-quality transmission.

More specifically, in the wireless communication, by using a Multicast IP address directly in an IP address of a destination, and using a Unicast MAC address in a MAC address of a destination, the re-transmission processing can be performed.

The third embodiment can be applied to the first embodiment described with reference to FIG. 7 and the second embodiment described with reference to FIG. 12. Note that the IP address used in the third embodiment is the same as the IP address used in the first embodiment.

Firstly, as shown in the system structure of FIG. 7, since the user terminal 105a and the user terminal 105d request for the program A1 to be watched or listened to, the first communication unit 102a uses a Multicast IP address 224.0.1.1 as an IP address and designates a MAC address of the second communication unit 104a as the address 1 in the MAC address, in order to perform Unicast communication. In the same manner, since the user terminal 105b requests the program A2 to be watched or listened to, the first communication unit 102a uses a Multicast IP address 224.0.1.2 (program A2) as an IP address and designates a MAC address of the second communication unit 104a as the address 1 in the Mac address, in order to perform Unicast communication. In the same manner, since the user terminal 105c requests the program A3 to be watched or listened to, the first communication unit 102a uses a Multicast IP address 224.0.1.3 (program A3) as an IP address and designates a MAC address of the second communication unit 104a as the address 1 in the Mac address, in order to perform Unicast communication. Note that the above Multicast IP addresses at the Network layer is assumed to be set by the program distribution unit (video server) 100.

In the second communication unit 104a, since the second communication unit 104a recognizes a transmitted frame as a frame addressed to the second communication unit 104a at the MAC layer processing, the processing proceeds to the Network layer which is an upper layer of the MAC layer, and since at the Network layer a Multicast IP address is directly used as the IP address to be transmitted, the IP Multicast system can be directly used in the transmission from the second communication unit 104a to each user terminal.

Here, in the second communication unit 104b, the IP address of the transmitted frame is a Multicast IP address, so that, for example, the second communication unit 104b detects a frame having a Multicast IP address 224.0.1.1 of the program A1 which the user terminal 105f requests to be watched or listened to, but a MAC address is not addressed to the second communication unit 104b, so that the re-transmission processing is not performed, thereby preventing imposing the re-transmission processing loads on the first communication unit 102a.

The first communication unit 102a according to the third embodiment can be realized to have a structure as described in the first and second embodiments with reference to FIG. 14. However, the third embodiment performs only the software processing for changing MAC addresses, and not changing IP addresses, so that the present invention can be realized to have a simpler structure.

As described above, by not changing the processing at the Network layer and by performing the re-transmission processing in the wireless communication, it is possible to ensure high-quality transmission.

Note that, since even in the processing after the wireless communication the Multicast IP address is used directly, it is not necessary to hold tables for managing specific Multicast IP addresses in the communication unit in the wireless communication such as the first communication unit and the second communication unit, and the IP Multicast processing can be also applied to a system having a simple structure.

Note also that in the structure shown in FIG. 12, a Multicast IP address is used for transmission from the first communication unit 102a to each user terminal, and a MAC address is used as a MAC address of each user terminal, so that it is possible to realize the present invention.

Figure 15:
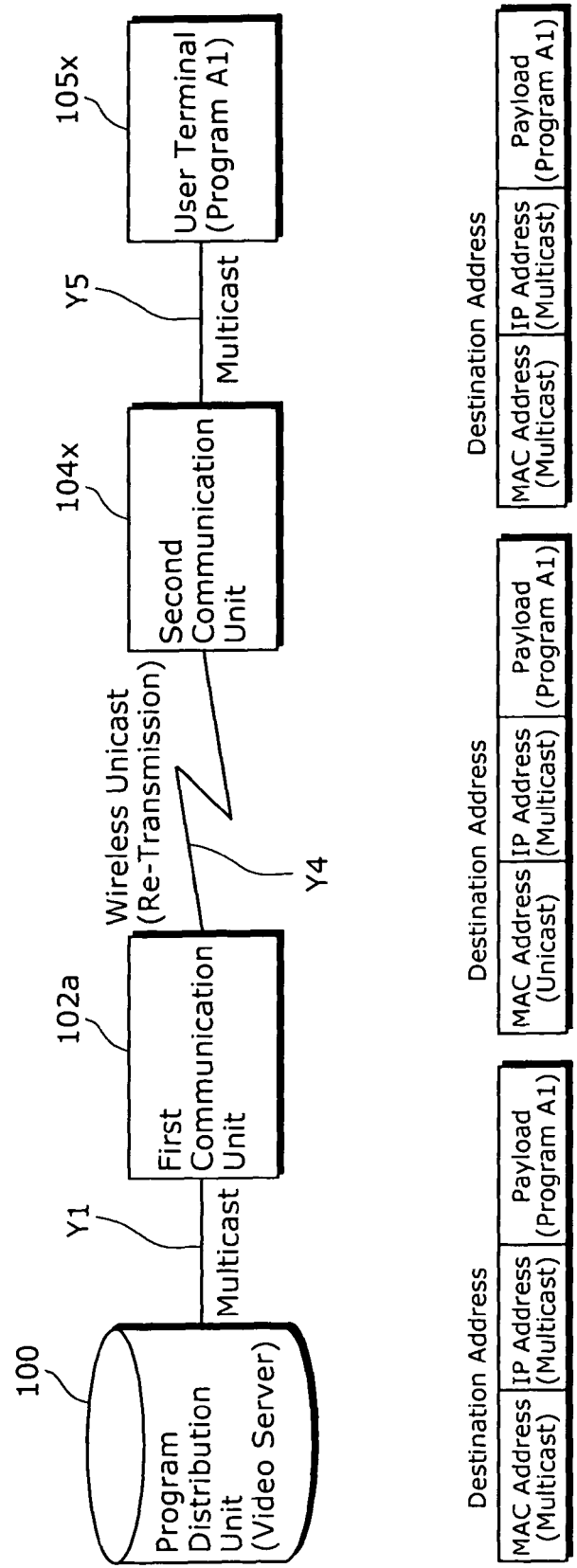
FIG. 15 is a diagram showing a structure of a communication system according to a variation.

Note also that, in the same manner as the other above embodiments, in the structure shown in FIG. 15, the communication path Y1 is a wire, a Multicast MAC address is used via the communication path Y1, and identical data is transmitted using Multicast to a plurality of destinations which are specified by a Multicast group. Furthermore, the communication path Y2 is radio, a Unicast MAC address is used via the communication path Y2, and identical data is transmitted using Unicast to the plurality of destinations which are specified by the Multicast group.

Note also that the communication path Y3 may be a wire, a Multicast MAC address may be used via the communication path Y3, and identical data may be transmitted using Multicast to the plurality of destinations which are specified by the Multicast group. Note also that, instead of the second communication unit 104a, as shown in FIG. 15, a second communication unit 104x having one Ethernet® connection port may be used. In this case, a Multicast MAC address is used via the communication path Y1 (wire) to perform transmission using Multicast. Further, via the communication path Y4 (radio) a Unicast MAC address is used to perform transmission using Multicast. Still further, via the communication path Y5 (wire) a Multicast MAC address is used to transmit using Multicast the program A1 to the user terminal 105x.

For example, when the user terminal 105x requests for the program A1 to be watched or listened to, the first communication unit 102a uses, for a frame of the program A1, a Multicast IP address 224.0.1.1 as an IP address and sets a MAC address of the second communication unit 104x as the address 1 of the MAC address in order to perform Unicast communication.

Then, when the second communication unit 104x receives the frame of the program A1 from the first communication unit 102a, the second communication unit 104x determines, at the MAC layer processing, that the received frame is addressed to the second communication unit 104x, so that the processing proceeds to the Network layer which is a upper layer of the MAC layer. Further, at the Network layer the Multicast IP address is used directly as the IP address, so that the Multicast IP address is used to perform further Multicast communication.

In other words, the second communication unit 104x is realized to have the same structure of the second communication unit 104a described in the first and second embodiments with reference to FIG. 14, and performs only processing for changing a Mac address, not changing an IP address.

Thereby by not changing the processing at the Network layer and by performing the re-transmission processing in the wireless communication, it is possible to ensure high-quality transmission. Note that, since even in the processing after the wireless communication the Multicast IP address is used directly, it is not necessary to hold tables for managing specific Multicast IP addresses in the communication unit in the wireless communication such as the first communication unit 102a and the second communication unit 104, and the IP Multicast processing can also be applied to a system having a simple structure.

Figure 16:
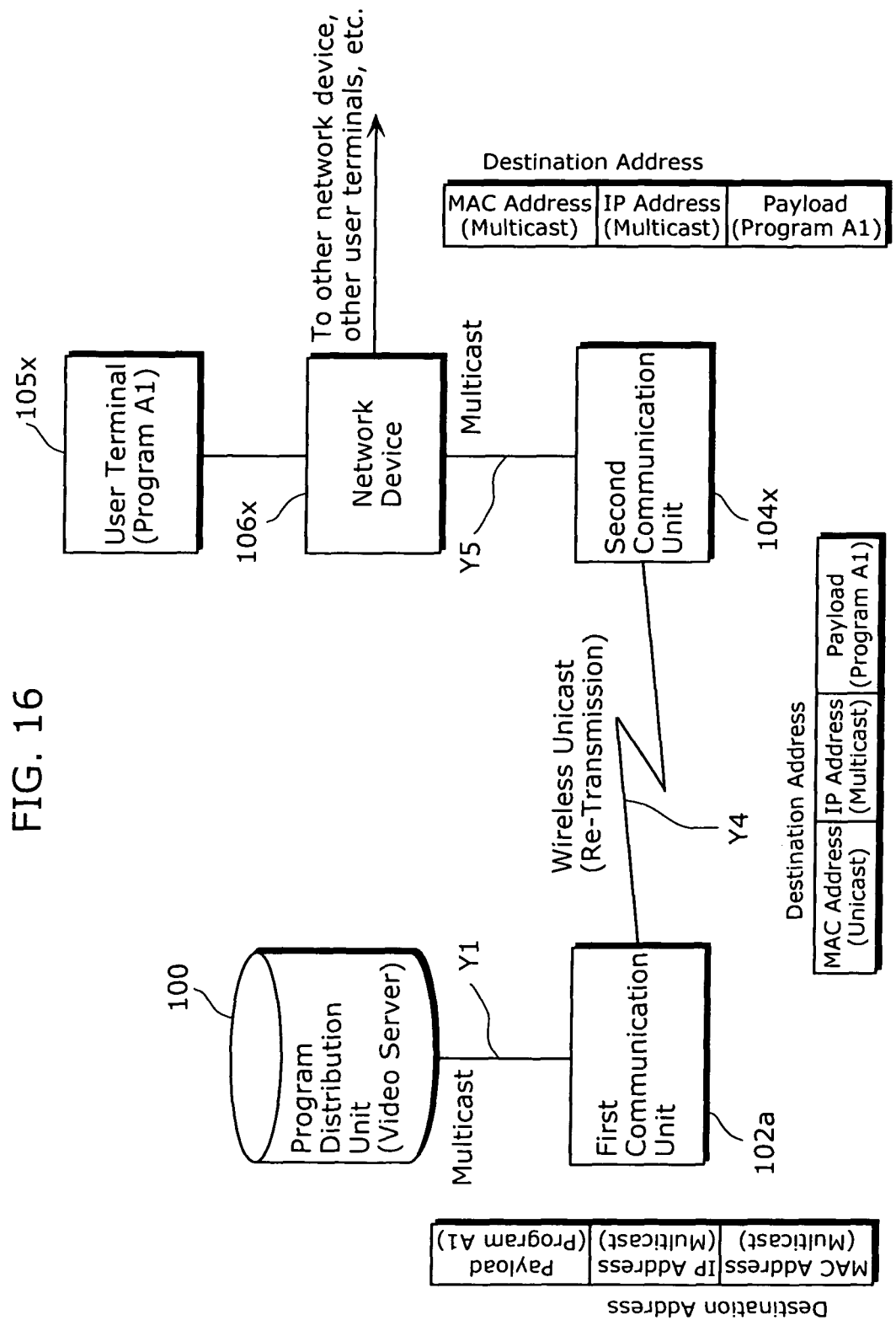
FIG. 16 is a diagram showing a structure of another communication system according to the variation.

Note also that, besides the network structure shown in FIG. 15, as shown in FIG. 16, a connecting end of a wire of the second communication unit 104x is connected via an Ethernet® to a network device such as a router, a bridge, and a hub, the second communication unit 104x may distribute using Multicast the program A1 to a user terminal 105x subsequently connected to the network device. That is, a frame which has been distributed using Multicast from the program distribution unit 100 is distributed to the second communication unit 104x via the wireless communication path Y4 using wireless Unicast instead of wireless Multicast, and in the second communication unit 104x, the frame is further distributed using Multicast to the subsequent network device 106x.

Note that FIG. 16 shows a structure in which the user terminal 105x is directly connected to the network device 106x, but the user terminal 105x may be connected to a network device (not shown) in a later stage of the network device 106x.

Furthermore, FIG. 16 shows only one user terminal, but a possible variation is that a plurality of user terminals are connected directly to the network device 106x and the network device in a later stage of the network device 106x. It is obvious that in a case where a plurality of user terminals request a plurality of programs, a plurality of Multicast streams are converted into respective wireless Unicast frames and transmitted separately via the wireless communication path, and in the second communication unit 104x the streams are re-converted to Multicast frames to be transmitted.

It is also obvious that in the third embodiment, as far as a network has a structure in which in the first communication unit 102a a frame which is generally to be transmitted using wireless Multicast is transmitted using wireless Unicast to each destination, and at a destination STA or AP the frame is further converted into a Multicast frame to be transmitted, an device which receives transmission using Multicast from the destination STA or AP may be the user terminal or the network device, or other communication devices.

Note that the second communication unit 104a or the second communication unit 104x may be not a STA, but an AP. Here, as one example of a use of the communication between APs, if an office or the like resides in two buildings, wiring is provided in one building using wires and wireless communication between APs is performed between the buildings.

Fourth Embodiment

The fourth embodiment describes a more efficient transmission method. As described above, in FIG. 8 for example, the program distribution from the first communication unit 102a to the second communication unit 104a is realized by transmitting a frame of each program. FIG. 10A is a schematic block diagram of frames used in the program distribution. In FIG. 10A, a reference numeral 400 represents the program distribution 230 in FIG. 8, 401 represents the program distribution 231 in FIG. 8, and 402 represents the program distribution 232 in FIG. 8. For the program distributions 400, 401, and 402, the IP frames of respective programs are transmitted in a chronological order. Note that, in FIG. 8, only the IP header which is a header based on the Network layer is shown, but in actual practice, another header which is used at the MAC layer and the lower layer is also used to designate wireless Unicast communication.

By using the protocol, in the wireless communication based on IEEE802.11 standard for example, in a case where a wireless channel access method by a distributed coordination function (DCF) is used to control access, every time a frame is transmitted, a receiving terminal (the second communication unit 104 in a case of FIG. 7) transmits an ACK frame to a transmitting terminal (the first communication unit 102 in the case of FIG. 7), and then if the transmitting terminal does not receive the ACK frame within a predetermined time period after the transmission, the transmitting terminal transmits the frame again.

Further, in a case of transmission by a point coordination function (PCF) by a centralized control, polling processing needs to be performed when a frame is transmitted.

This means that, in the wireless transmission, every time a frame is transmitted, it is necessary to transmit not only the desired frame (program data in the present embodiments) but also a frame for controlling wireless access, thereby consuming a transmission band during the transmission of the frames, so that efficiency of the transmission becomes low. More specifically, in FIG. 10A, transmission bands for the program distributions 460, 461, and 462 are consumed. Moreover, there is a problem of causing a processing load in an access point (the first communication unit 102) and a station (the second communication unit 104).

The fourth embodiment describes efficient transmission as shown in FIG. 10B. An aspect of the present invention is that by reducing the number of frames to be transmitted in wireless communication, the frames for controlling wireless accesses are reduced, so that efficient transmission can be performed. In FIG. 10B, three program data is multiplexed into one frame to be transmitted.

In a frame 403, a reference numeral 440 represents an IP header, and a reference numeral 441 represents information indicating that program information regarding next program data is the program A1 and is equivalent to 411. A reference numeral 442 represents data of the program A1 and equivalent to 412. 443 is information indicating that program information regarding next program data is the program A2, and is equivalent to 421. 444 is data of the program A2 and equivalent to 422. 445 is information indicating that program information regarding next program data is the program A3 and is equivalent to 431. 446 is data of the program A3 and equivalent to 432. After the frame 403 in which the three programs are multiplexed is transmitted, an ACK frame 452 is transmitted.

Figure 11:
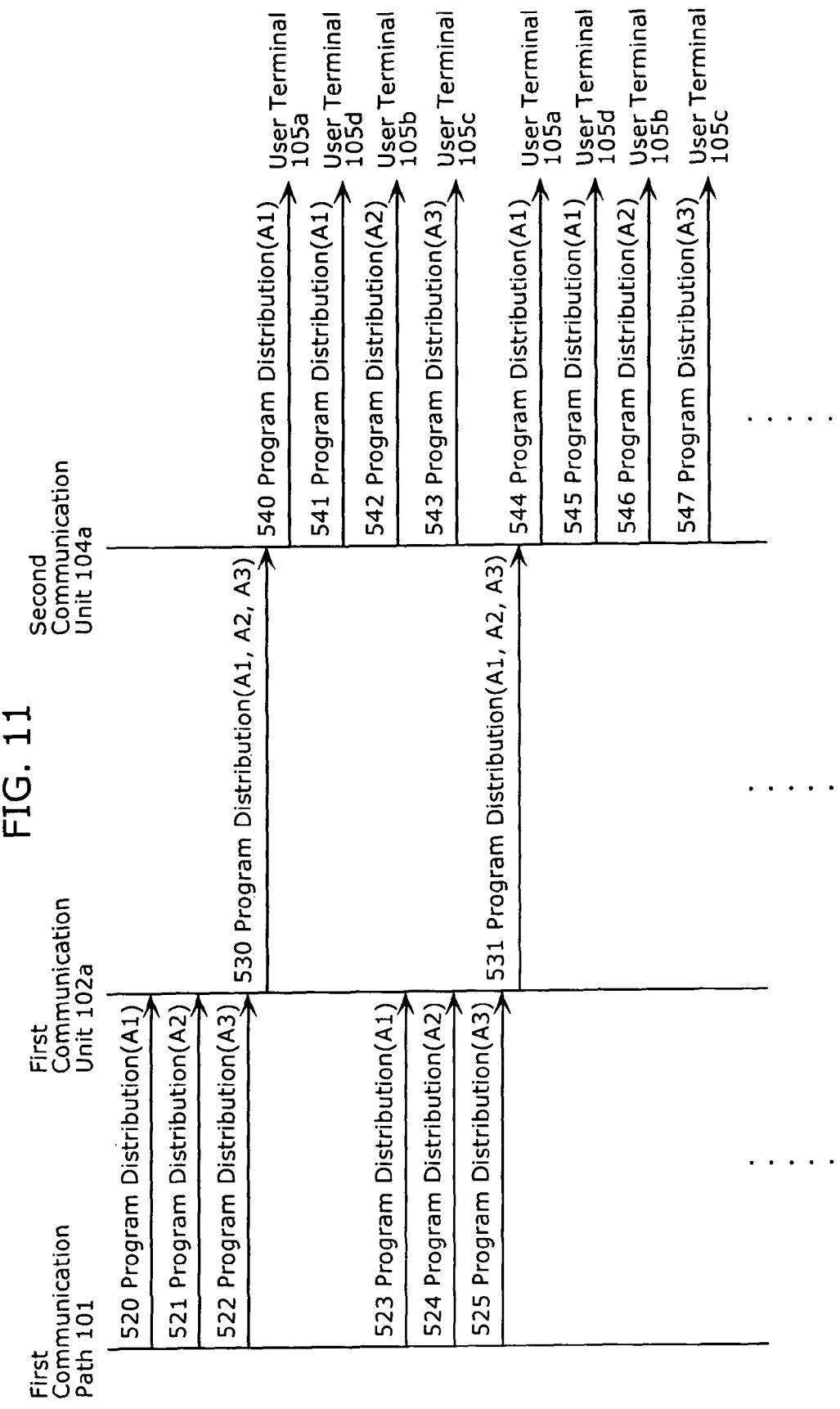
FIG. 11 is a diagram showing still another example of the processing according to the present invention.

FIG. 11 is a diagram showing one example of the processing according to the present invention. In FIG. 11, programs transmitted by IP Multicast via the first communication path 101 are assumed to be the same programs in FIG. 9. The first communication unit 102a obtains via the first communication path 101 a program frame 520 (program A1) transmitted using a Multicast IP address 224.0.1.1, a program frame 521 (program A2) transmitted using a Multicast IP address 224.0.1.2, and a program frame 522 (program A3) transmitted using a Multicast IP address 224.0.1.3, sequentially. Next, at a program distribution 530, the first communication unit 102a transmits the obtained frames as a Unicast frame having a source address 133.181.127.200 and a destination address 133.181.127.201 from the first communication unit 102a to the second communication unit 104a. Here, a structure of the frame is the same as the frame 403 shown in FIG. 10B. The second communication unit 104a which has received the program distribution frame 530 extracts data of the program A1 from the frame of the program distribution 530, and distributes the extracted data to the user terminal 105a at a program distribution 540. Furthermore, the data of the program A1 is duplicated to be distributed to the user terminal 105d at a program distribution 541.

Furthermore, the second communication unit 104a extracts data of the program A2 from the frame transmitted at the program distribution 530 in order to be distributed to the user terminal 105b at a program distribution 542. Still further, the second communication unit 104a extracts data of the program A3 from the frame transmitted at the program distribution 530 in order to be distributed to the user terminal 105c at a program distribution 543.

Subsequent processing from a program distribution 523 to a program distribution 547 are performed in the same manner as described above.

Note that FIG. 11 shows one example in which the programs A1, A2, and A3 are transmitted via the first communication path 101 in the order as shown at 520, 521, and 522, but since the spirit of the present invention is in efficient use of the transmission bands by reducing processing using the wireless LAN by grouping a plurality of program data into one frame, the order of transmission is not limited to the above.

In the fourth embodiment, the processing performed by the first communication unit 102 is realized by using the same structure as described in the first to third embodiments with reference to FIG. 14. In this case, regarding an operation of software processing performed by the CPU 8002, the CPU 8002 firstly receives a plurality of the program frames (400, 401, and 402) shown in FIG. 10A from the first communication path 101 via the first communication path interface 8000 and temporarily stores the received frames in the memory 8003. Next, the CPU 8002 reads out the program information and the program data from the memory 8003, multiplexes the program information and the program data, adds a destination IP address 440 of an IP address of the second communication unit or a user terminal to generate a 403, and then transmits the data to the second communication path 103 via the second communication path interface 8001.

As described above, by grouping a plurality of program frames, transmission bands to be utilized by the ACK frame are reduced, so that it is possible to realize wireless communication efficiently using the bands. Furthermore, as obvious in FIG. 10B, it is obvious that the number of data in a header subsequent to an IP header and a wireless MAC frame (not shown in FIG. 10B) is reduced, so that the transmission bands equivalent to the reduced data can be efficiently used.

Note that in the first to fourth embodiments according to the present invention, the wireless LAN is used as one example of the communication method for performing the re-transmission processing, but the present invention is not limited to the above and can be applied to other communication methods for performing the re-transmission processing, and modifications by using other transmission methods do not depart from the scope of the present invention.

Note that a communication program is a program which is executed in a communication device such as a STA or an AP in order to realize each function in the communication device, and can be stored in a computer-readable recording medium such as an optic recording medium (a CD-ROM or the like, for example), a magnetic recording medium (a hard disk or the like, for example), a magneto-optic recording medium (MO or the like, for example), or a semiconductor recording medium (a memory card or the like, for example) in order to be read out onto a hardware system such as a computer system or an installation system.

Further, the communication program can be stored in a hardware system on a network, and realized in another hardware system which downloads the computer program via the network.

Note that one or more functions included in the communication device such as a STA or an AP can be realized in the communication device by a program stored in a nonvolatile memory device, or can be built in a system LSI such as a network processor. Furthermore, the system LSI can be realized by a full-custom LSI (Large Scale Integration). Still further, the system LSI can be realized by a semi-custom LSI such as an application specific integrated circuit (ASIC). Still further, the system LSI can be realized by a programmable logic device such as a field programmable gate array (FPGA) or a complex programmable logic device (DPLD). Still further, the system LSI can be realized as a dynamic reconfigurable device in which a circuit structure can be dynamically re-written.

Moreover, design data for forming one or more functions included in the communication device such as a STA or an AP into the above LSI may be a very high speed integrated circuit Hardware Description Language (VHDL) which is a program described in a hardware description language such as a Verilog HDL or a system C. Furthermore, the design data may be a net list of a gate level which can be obtained by using logic synthesis of a HDL program. Still further, the design data may be macrocell information in which the net list of the gate level is added with placement information, process condition, and the like. Still further, the design data may be mask data defining a size, a timing, and the like.

Moreover, the design data can be stored in the computer-readable recording medium such as an optic recording medium (a CD-ROM or the like, for example), a magnetic recording medium (a hard disk or the like, for example), a magneto-optic recording medium (MO or the like, for example), or a semiconductor recording medium (a memory card or the like, for example) in order to be read out onto a hardware system such as a computer system or an installation system. In addition, the design data which has been read out onto another hardware system via the recording medium can be downloaded to the programmable logic device via a download cable.

Moreover, the design data can be stored in a hardware system on a transmission path so that the design data can be obtained by another hardware system via a transmission path such as a network. Furthermore, via the communication path from the hardware system, the design data stored in another hardware system can be downloaded in the programmable logic device via the download cable.

Moreover, the design data which is logically synthesized, placed, and wired can be stored in a serial ROM in order to be transferred to a FPGA when power is switched ON. Then, the design data stored in the serial ROM can be downloaded in the FPGA immediately after the power is switched ON.

Furthermore, the design data which is logically synthesized, placed, and wired can be generated by a micro processor and downloaded to the FPGA.

The communication device and the communication system according to the present invention can be realized as a system for performing Multicast communication, the present invention is suitable, for example, for a system for distributing video programs to a plurality of terminals of passengers in an airplane and the like.

The invention claimed is:

1. A communication system, comprising:
a first communication device; and
a second communication device,
wherein the first communication device includes:
a first content receiving unit operable to receive, via a first communication path, a Multicast frame which stores a content and has a Multicast IP address as a destination address at a Network Layer of the Multicast frame;
a conversion unit operable to convert the received Multicast frame into a Unicast frame addressed to the second communication device, the Unicast frame having only one IP header storing only one Multicast IP address, which is the same as the Multicast IP address of the Multicast frame, as a destination address at a Network Layer of the Unicast frame, the Unicast frame also having a Media Access Control (MAC) address of the second communication device as a destination address at a Data Link Layer of the Unicast frame, the only one Multicast IP address in the Unicast frame being stored in an IP header of the Unicast frame, the MAC address in the Unicast frame being stored in a MAC header of the Unicast frame, the IP header and the MAC header being adjacent to each other with no information therebetween, and the IP header storing the Multicast IP address, wherein there is no IP address between the Multicast IP address stored in the IP header and the MAC header; and
a first content transmission unit operable to transmit the converted Unicast frame to the second communication device via a second communication path, based on a protocol having a re-transmission processing, and
the second communication device includes:
a second content receiving unit operable to receive the Unicast frame transmitted via the second communication path from the first communication device based on the protocol having the re-transmission processing,
wherein the re-transmission processing is performed at a Media Access Control (MAC) layer that is a layer lower than a layer of a communication protocol defining the Multicast frame.

2. The communication system according to claim 1,
wherein the second communication device further includes a second content request unit operable to request the first communication device to distribute the content, and
the first communication device further includes a first content request receiving unit operable to receive the content request from the second communication device, and
wherein the first content receiving unit is operable to extract from Multicast frames transmitted via the first communication path a Multicast frame which stores a content corresponding to the content request received by the first content request receiving unit, and operable to receive the extracted Multicast frame.

3. The communication system according to claim 2 further comprising a plurality of the second communication devices,
wherein the first content request receiving unit is operable to receive the content requests from the plurality of the second communication devices,
the first content receiving unit is operable to extract from the Multicast frames which are transmitted via the first communication path Multicast frames corresponding to a plurality of contents corresponding to the plurality of the content requests received by the first content request receiving unit, and operable to receive the extracted Multicast frames, the conversion unit is operable to convert the plurality of the Multicast frames which have been received by the first content receiving unit and are corresponding to the plurality of the contents into Unicast frames which are addressed to the plurality of the second communication devices which have requested the contents, and the first content transmission unit is operable to transmit the Unicast frames which have been converted by the conversion unit to the plurality of the second communication devices.

4. The communication system according to claim 3, wherein the first communication device further includes a first content duplication unit operable to duplicate a content requested by the plurality of the second communication devices among a plurality of contents included in the Multicast frames received by the first content receiving unit, and wherein the conversion unit is operable to convert the Multicast frames corresponding to a plurality of the identical contents which have been duplicated by the first content duplication unit into Unicast frames which are addressed to the plurality of the second communication devices which have requested the content, and the first content transmission unit is operable to transmit the Unicast frames which have been converted by the conversion unit to the plurality of the second communication devices which have requested the content.

5. The communication system according to claim 1 further comprising a third communication device which is connected to the second communication device, wherein the second communication device further includes a second content transmission unit operable to transmit a content included in the Unicast frame received by the second content receiving unit to the third communication device, and the third communication device is operable to receive the content transmitted from the second communication device and to provide the received content to a user.

6. The communication system according to claim 5, wherein the second content transmission unit is operable to convert the Unicast frame received by the second content receiving unit into a Multicast frame.

7. The communication system according to claim 5, wherein the second communication device further includes:

a second content request receiving unit operable to receive the content request from the third communication device;

a second content request unit operable to request the first communication device to distribute a content corresponding to the content request received by the second content request receiving unit, and the first communication device further includes a first content request receiving unit operable to receive the content request from the second communication device, and wherein the first content receiving unit is operable to extract from Multicast frames which have been transmitted via the first communication path a Multicast frame which stores the content corresponding to the content request received by the first content request receiving unit, and operable to receive the extracted Multicast frame.

8. The communication system according to claim 7 further comprising a plurality of the third communication devices, wherein the second communication device further includes a second content duplication unit operable to duplicate the content requested by the plurality of the third communication devices among a plurality of contents included in the Unicast frames received by the second content receiving unit, and the second content transmission unit operable to transmit a plurality of identical contents which have been duplicated by the second duplication unit to the plurality of the third communication devices which have requested the contents.

9. The communication system according to claim 7 further comprising a plurality of the third communication devices, wherein the second content request unit is operable to request the first communication device to distribute the content after receiving all content requests from the plurality of the third communication devices, in a case where the contents requested by the plurality of the third communication devices are identical.

10. The communication system according to claim 1, wherein the first content receiving unit is operable to receive a Multicast frame which stores a plurality of the contents, and wherein the conversion unit is operable to convert the Multicast frame corresponding to the plurality of the contents received by the first content receiving unit into a Unicast frame, in order to store the plurality of the contents into the single Unicast frame.

11. The communication system according to claim 1, wherein the first communication path is a wire, and the first content receiving unit is operable to receive, via the first communication path, the Multicast frame which stores the content, based on the protocol having the re-transmission processing.

12. A transmitting device which transmits a content to a receiving device, the transmitting device comprising:

a first content receiver configured to receive, via a first communication path, a Multicast frame which stores the content and has a Multicast IP address as a destination address at a Network Layer of the Multicast frame;

a converter configured to convert the received Multicast frame into a Unicast frame addressed to the receiving device, the Unicast frame having only one IP header storing only one Multicast IP address, which is the same as the Multicast IP address of the Multicast frame, as a destination address at a Network Layer of the Unicast frame, the Unicast frame also having a Media Access Control (MAC) address of the receiving device as a destination address at a Data Link Layer of the Unicast frame, the only one Multicast IP address in the Unicast frame being stored in an IP header of the Unicast frame, the MAC address in the Unicast frame being stored in a MAC header of the Unicast frame, the IP header and the MAC header being adjacent to each other with no information therebetween, and the IP header storing the Multicast IP address, wherein there is no IP address between the Multicast IP address stored in the IP header and the MAC header; and a first content transmitter configured to transmit the converted Unicast frame to the receiving device via a second communication path, based on a protocol having a re-transmission processing, wherein the re-transmission processing is performed at a Media Access Control (MAC) layer that is a layer lower than a layer of a communication protocol defining the Multicast frame.

13. A receiving device which receives a content transmitted from a transmitting device,
  wherein the transmitting device includes:
    a first content receiver configured to receive, via a first communication path, a Multicast frame which stores the content and has a Multicast IP address as a destination address at a Network Layer of the Multicast frame;
    a first converter configured to convert the received Multicast frame into a Unicast frame addressed to the receiving device, the Unicast frame having only one IP header storing only one Multicast IP address, which is the same as the Multicast IP address of the Multicast frame, as a destination address at a Network Layer of the Unicast frame, the Unicast frame also having a Media Access Control (MAC) address of the receiving device as a destination address at a Data Link Layer of the Unicast frame, the only one Multicast IP address in the Unicast frame being stored in an IP header of the Unicast frame, the MAC address in the Unicast frame being stored in a MAC header of the Unicast frame, the IP header and the MAC header being adjacent to each other with no information therebetween, and the IP header storing the Multicast IP address, wherein there is no IP address between the Multicast IP address stored in the IP header and the MAC header; and
    a first content transmitter configured to transmit the converted Unicast frame to the receiving device via a second communication path, based on a protocol having a re-transmission processing, and
  the receiving device comprising:
    a second content receiver configured to receive the Unicast frame transmitted from the transmitting device based on the protocol having the re-transmission processing; and
    a second converter configured to convert the Unicast frame received by the second content receiver to a Multicast frame,
  wherein the re-transmission processing is performed at a Media Access Control (MAC) layer that is a layer lower than a layer of a communication protocol defining the Multicast frame.

14. A communication method for transmitting a content to a receiving device, the communication method comprising:
  receiving, via a first communication path, a Multicast frame which stores a content and has a Multicast IP address as a destination address at a Network Layer of the Multicast frame;
  converting the received Multicast frame into a Unicast frame addressed to the receiving device, the Unicast frame having only one IP header storing only one Multicast IP address, which is the same as the Multicast IP address of the Multicast frame, as a destination address at a Network Layer of the Unicast frame, the Unicast frame also having a Media Access Control (MAC) address of the receiving device as a destination address at a Data Link Layer of the Unicast frame, the only one Multicast IP address in the Unicast frame being stored in an IP header of the Unicast frame, the MAC address in the Unicast frame being stored in a MAC header of the Unicast frame, the IP header and the MAC header being adjacent to each other with no information therebetween, and the IP header storing the Multicast IP address, wherein there is no IP address between the Multicast IP address stored in the IP header and the MAC header; and
  transmitting the converted Unicast frame to the receiving device via a second communication path, based on a protocol having a re-transmission processing,
  wherein the re-transmission processing is performed at a Media Access Control (MAC) layer that is a layer lower than a layer of a communication protocol defining the Multicast frame.

15. A content distribution system for distributing a content to a seat in the content distribution system, the content distribution system comprising:
  a first communication device and a second communication device,
  wherein the first communication device includes:
    a first content receiving unit operable to receive, via a first communication path, a Multicast frame which stores a content and has a Multicast IP address as a destination address at a Network Layer of the Multicast frame;
    a conversion unit operable to convert the received Multicast frame into a Unicast frame addressed to the second communication device, the Unicast frame having only one IP header storing only one Multicast IP address, which is the same as the Multicast IP address of the Multicast frame, as a destination address at a Network Layer of the Unicast frame, the Unicast frame also having a Media Access Control (MAC) address of the second communication device as a destination address at a Data Link Layer of the Unicast frame, the only one Multicast IP address in the Unicast frame being stored in an IP header of the Unicast frame, the MAC address in the Unicast frame being stored in a MAC header of the Unicast frame, the IP header and the MAC header being adjacent to each other with no information therebetween, and the IP header storing the Multicast IP address, wherein there is no IP address between the Multicast IP address stored in the IP header and the MAC header; and
    a first content transmission unit operable to transmit the converted Unicast frame to the second communication device via a second communication path, based on a protocol having a re-transmission processing, and
  the second communication device includes:
    a second content receiving unit operable to receive the Unicast frame transmitted from the first communication device via the second communication path based on the protocol having the re-transmission processing; and
    a second content transmission unit operable to transmit the content included in the Unicast frame received by the second content receiving unit to the seat,
  wherein the re-transmission processing is performed at a Media Access Control (MAC) layer that is a layer lower than a layer of a communication protocol defining the Multicast frame.

16. A communication method which is performed by a communication system including a first communication device and a second communication device, the communication method comprising:
  receiving, by the first communication device, via a first communication path, a Multicast frame which stores a content and has a Multicast IP address as a destination address at a Network Layer of the Multicast frame;
  converting, by the first communication device, the received Multicast frame into a Unicast frame addressed to the second communication device, the Unicast frame having only one IP header storing only one Multicast IP address, which is the same as the Multicast IP address of the Multicast frame, as a destination address at a Network Layer of the Unicast frame the Unicast frame also having a Media Access Control (MAC) address of the second communication device as a destination address at a Data Link Layer of the Unicast frame, the only one Multicast IP address in the Unicast frame being stored in an IP header of the Unicast frame, the MAC address in the Unicast frame being stored in a MAC header of the Unicast frame, the IP header and the MAC header being adjacent to each other with no information therebetween, and the IP header storing the Multicast IP address, wherein there is no IP address between the Multicast IP address stored in the IP header and the MAC header;

transmitting, by the first communication device, the converted Unicast frame to the second communication device via a second communication path, based on a protocol having a re-transmission processing; and receiving, by the second communication device, the Unicast frame transmitted via the second communication path from the first communication device based on the protocol having the re-transmission processing, wherein the re-transmission processing is performed at a layer lower than a layer of a communication protocol defining the Multicast frame.

17. A communication method which is performed by a receiving device which receives a content transmitted from a transmitting device, the transmitting device executing:

receiving, via a first communication path, a Multicast frame which stores the content and has a Multicast IP address as a destination address at a Network Layer of the Multicast frame;

converting the received Multicast frame into a Unicast frame addressed to the receiving device, the Unicast frame having only one IP header storing only one Multicast IP address, which is the same as the Multicast IP address of the Multicast frame, as a destination address at a Network Layer of the Unicast frame, the Unicast frame also having a Media Access Control (MAC) address of the receiving device as a destination address at a Data Link Layer of the Unicast frame, the only one Multicast IP address in the Unicast frame being stored in an IP header of the Unicast frame, the MAC address in the Unicast frame being stored in a MAC header of the Unicast frame, the IP header and the MAC header being adjacent to each other with no information therebetween, and the IP header storing the Multicast IP address, wherein there is no IP address between the Multicast IP address stored in the IP header and the MAC header; and transmitting the converted Unicast frame to the receiving device via a second communication path, based on a protocol having a re-transmission processing, the communication method comprising:

receiving, by the receiving device, the Unicast frame transmitted from the transmitting device based on the protocol having the re-transmission processing; and converting, by the receiving device, the received Unicast frame to a Multicast frame, wherein the re-transmission processing is performed at a Media Access Control (MAC) layer that is a layer lower than a layer of a communication protocol defining the Multicast frame.

* * * * *